(12) United States Patent
Fujinaka

(10) Patent No.: US 9,513,461 B2
(45) Date of Patent: Dec. 6, 2016

(54) LENS BARREL

(71) Applicant: Panasonic Intellectual Property Management Co., Ltd., Osaka (JP)

(72) Inventor: Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 203 days.

(21) Appl. No.: 14/597,285

(22) Filed: Jan. 15, 2015

(65) Prior Publication Data

US 2015/0124331 A1 May 7, 2015

Related U.S. Application Data

(63) Continuation of application No. PCT/JP2013/003967, filed on Jun. 25, 2013.

(30) Foreign Application Priority Data

Jul. 17, 2012 (JP) ................. 2012-158505
Jul. 17, 2012 (JP) ................. 2012-158506
Jul. 17, 2012 (JP) ................. 2012-158507

(51) Int. Cl.
G02B 15/14 (2006.01)
G02B 7/10 (2006.01)
G02B 7/02 (2006.01)
G02B 27/64 (2006.01)

(52) U.S. Cl.
CPC ............... *G02B 7/10* (2013.01); *G02B 7/022* (2013.01); *G02B 7/102* (2013.01); *G02B 27/646* (2013.01)

(58) Field of Classification Search
CPC ......... G02B 7/10; G02B 7/102; G02B 27/646; G02B 7/022

USPC .......................................................... 359/700
See application file for complete search history.

(56) References Cited

U.S. PATENT DOCUMENTS

| | | |
|---|---|---|
| 2003/0184877 A1 | 10/2003 | Kabe |
| 2004/0165280 A1 | 8/2004 | Ichino |
| 2005/0057823 A1 | 3/2005 | Ichino |
| 2007/0183766 A1 | 8/2007 | Miyamori et al. |
| 2010/0195206 A1 | 8/2010 | Miyamori et al. |
| 2011/0267712 A1 | 11/2011 | Umeda et al. |
| 2011/0317266 A1 | 12/2011 | Miyamori et al. |

FOREIGN PATENT DOCUMENTS

| | | |
|---|---|---|
| JP | 2000-111781 | 4/2000 |
| JP | 2000-147355 | 5/2000 |
| JP | 2002-055268 | 2/2002 |
| JP | 2002-350703 | 12/2002 |

(Continued)

OTHER PUBLICATIONS

International Search Report for corresponding International Application No. PCT/JP2013/003967 mailed Oct. 1, 2013.

*Primary Examiner* — Alicia M Harrington
(74) *Attorney, Agent, or Firm* — Renner, Otto, Boisselle & Sklar, LLP

(57) ABSTRACT

A lens barrel includes a cam frame, a zoom motor unit driving the cam frame to rotate, and a fifth group unit engaging with the cam frame through a fifth cam follower. The cam frame is provided with an internal gear engaging with the zoom motor unit, and a fifth cam groove engaging with the fifth cam follower. The fifth cam groove is continuous with a tooth space formed between two adjacent teeth of the internal gear. The fifth cam follower is smaller than the tooth space to pass through the tooth space.

7 Claims, 23 Drawing Sheets

(56) References Cited

FOREIGN PATENT DOCUMENTS

| | | |
|---|---|---|
| JP | 2003-043336 | 2/2003 |
| JP | 2003-295031 | 10/2003 |
| JP | 2004-198499 | 7/2004 |
| JP | 2004-258302 | 9/2004 |
| JP | 2007-241254 | 9/2007 |
| JP | 2011-154365 | 8/2011 |
| WO | WO 2008/155906 A1 | 12/2008 |

LENS BARREL

CROSS-REFERENCE TO RELATED APPLICATIONS

This is a continuation of International Application No. PCT/JP2013/003967 filed on Jun. 25, 2013, which claims priority to Japanese Patent Applications Nos. 2012-158505, 2012-158506, and 2012-158507 filed on Jul. 17, 2012. The entire disclosures of these applications are incorporated by reference herein.

BACKGROUND

The present disclosure relates to lens barrels.

Japanese Unexamined Patent Publication No. 2002-55268 describes a lens barrel including a frame body provided with cam grooves, and a frame body provided with cam followers engaging with the cam grooves. The cam grooves are spaced from an end of the frame body along a direction of an optical axis. The frame body is provided with introducing grooves extending from the end of the frame body to the cam grooves. In assembling the two frame bodies, the cam followers travel through the introducing grooves to enter the cam grooves.

SUMMARY

The present disclosure provides a lens barrel which can advantageously be downsized.

The disclosed lens barrel includes a cam frame, a first driver for driving the cam frame to rotate about an optical axis, and a first optical unit including a cam follower, and engaging with the cam frame through the cam follower to move in an optical axis direction as the cam frame rotates, wherein the cam frame is provided with a gear part engaging with the first driver, and a cam groove engaging with the cam follower, the gear part includes a plurality of teeth aligned in a circumferential direction about the optical axis, the cam groove is continuous with a tooth space formed between two adjacent teeth, and the cam follower is smaller than the tooth space to pass through the tooth space.

The disclosed lens barrel can advantageously be downsized.

DETAILED DESCRIPTION

Embodiments will be described in detail below with reference to the drawings. The description may not be provided in more detail than necessary in some cases. For example, well-known issues may not be described in detail, and description of substantially the same structure as a previously mentioned structure may be omitted. This is to avoid unnecessary redundant description, and to enable those skilled in the art to easily understand the disclosure.

The inventor provides the attached drawings and the following description to enable those skilled in the art to sufficiently understand the disclosure. The drawings and the description do not intend to limit the subject matter of claims.

First Embodiment

[1. General Structure of Lens Barrel]

Figure 1:
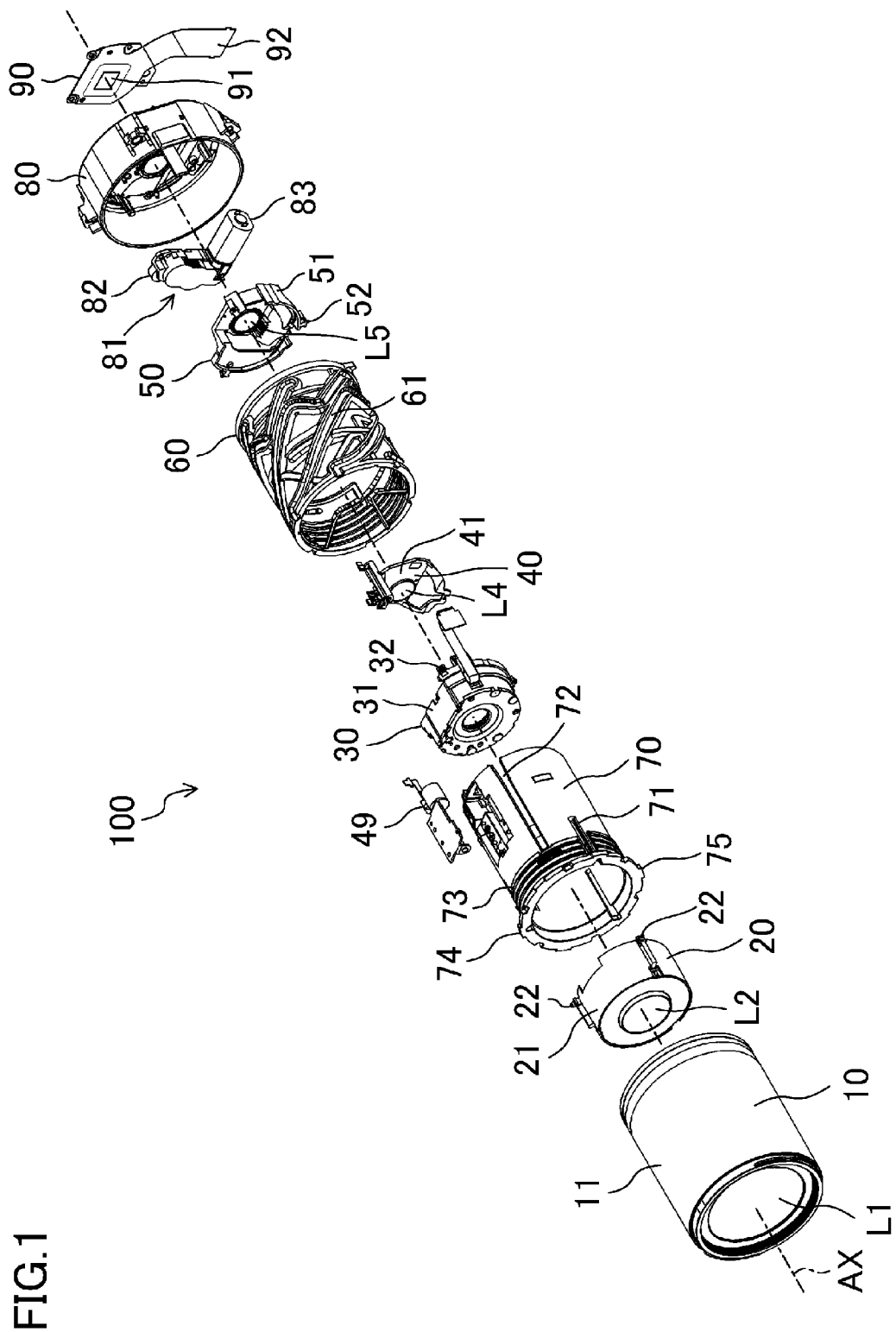
FIG. 1 is an exploded perspective view of a lens barrel of a first embodiment.

FIG. 1 is an exploded perspective view of a lens barrel 100. For convenience sake, with the lens barrel 100 of the present embodiment attached to a camera body, a direction toward an object along an optical axis AX of the lens barrel 100 is referred to as a "front" side or a "positive side in a Z-axis direction," and a direction toward the camera body along the optical axis AX is referred to as a "rear" side or a "negative side in the Z-axis direction." A direction to the right of the camera when viewed from the object facing the camera body along the optical axis AX is referred to as a "right" side or a "positive side in an X-axis direction," and a direction to the left of the camera when viewed from the object facing the camera body along the optical axis AX is referred to as a "left" side or a "negative side in the X-axis direction." Further, a direction upward from the object facing the camera body along the optical axis AX is referred to as an "upper" side or a "positive side in a Y-axis direction," and a direction downward from the object facing the camera body along the optical axis AX is referred to as a "lower" side or a "negative side in the Y-axis direction."

Unless otherwise specified, a direction parallel to the optical axis AX is referred to as an "optical axis direction," a direction perpendicular to the optical axis direction is referred to as a "radial direction," and a direction along a circle around the optical axis AX is referred to as a "circumferential direction." The optical axis AX substantially coincides with axial centers of frames constituting the lens barrel 100.

Unless otherwise specified, regarding movement in the optical axis direction, to "translate" means to move along the optical axis AX without rotation in the circumferential direction, and to "move" means not only to translate, and but also to move along the optical axis AX with rotation in the circumferential direction.

The lens barrel 100 includes a first group unit 10, a second group unit 20, a third group unit 30, a fourth group unit 40, a focus motor unit 49, a fifth group unit 50, a cam frame 60, an inner frame 70, a master flange 80, a zoom motor unit 81, and an imaging device unit 90. The first group unit 10, the second group unit 20, the third group unit 30, the fourth group unit 40, and the fifth group unit 50 hold corresponding lenses. The lenses form an optical system. That is, the lens barrel 100 holds the optical system.

The zoom motor unit 81 drives the cam frame 60 to rotate. The first group unit 10, the second group unit 20, the third group unit 30, and the fifth group unit 50 engage with the cam frame 60, and are driven by the rotation of the cam frame 60 to move along the optical axis direction.

The fourth group unit 40 is held by a shaft provided in the inner frame 70, and is driven by the focus motor unit 49 to move along the optical axis direction.

The imaging device unit 90 includes an imaging device 91 and a flexible printed circuit board 92. The imaging device 91 converts light incident on an imaging surface to an electric signal. The flexible printed circuit board 92 connects the imaging device 91 and a main circuit (not shown).

The master flange 80 is attached to a camera body (not shown). The master flange 80 includes a cylindrical wall and a bottom wall provided inside the cylindrical wall. An opening is formed in the center of the bottom wall. The imaging device unit 90 is attached to a rear surface of the bottom wall. The zoom motor unit 81 is attached to a front surface of the bottom wall. The zoom motor unit 81 includes a drive gear 82, and a zoom motor 83 for driving the drive gear 82 to rotate. The zoom motor unit 81 is an example of a first driver.

The cam frame 60 is substantially cylindrical. A first cam groove 61 is formed in an outer circumferential surface of the cam frame 60. The first cam groove 61 extends from a front edge to a rear end part of the outer circumferential surface. A first cam follower of the first group unit 10 described later engages with the first cam groove 61.

Figure 2:
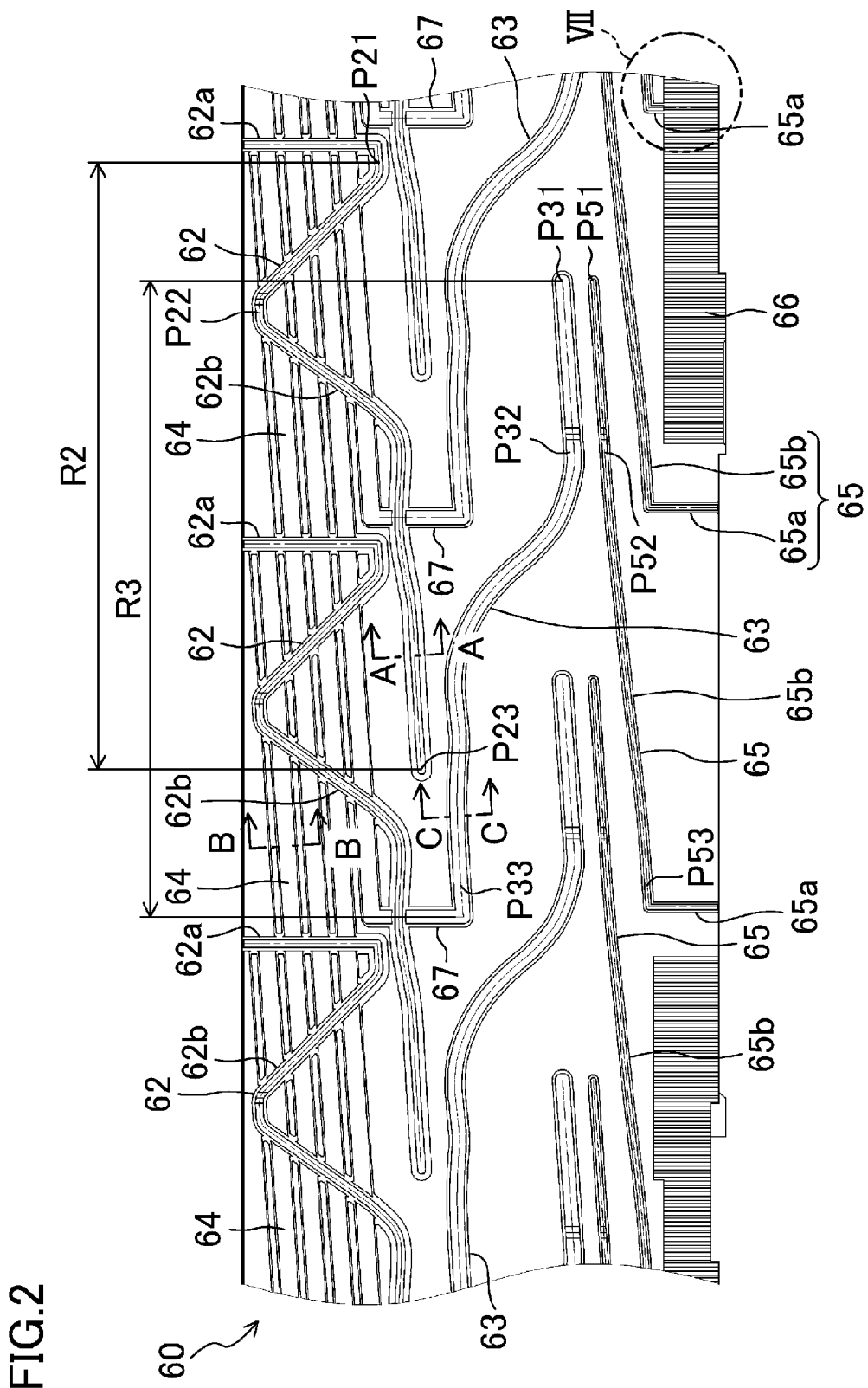
FIG. 2 is a development view of an inner circumferential surface of a cam frame.

FIG. 2 shows a development view of an inner circumferential surface of the cam frame 60. Three second cam grooves 62, three third cam grooves 63, three helicoid grooves 64, three fifth cam grooves 65, and a single internal gear 66 are formed in the inner circumferential surface of the cam frame 60.

The helicoid grooves 64 are formed in a front part of the cam frame 60. The helicoid grooves 64 extend obliquely rearward from the front edge of the cam frame 60 in a helical fashion along the inner circumferential surface.

The second cam grooves 62 are formed in the front part of the cam frame 60, and intersect with the helicoid grooves 64. Each of the second cam grooves 62 includes an introducing part 62a extending rearward from the front edge of the cam frame 60, and a guiding part 62b continuously extending from the introducing part 62a in a predetermined shape. The guiding part 62b includes a refraction position P21, a wide-angle position P22, and a telephoto position P23. In this specification, the retraction position of the cam groove designates a position where the corresponding cam follower is located when the lens barrel 100 is retracted. The wide-angle position of the cam groove designates a position where the corresponding cam follower is located when the lens barrel 100 is in a maximum wide-angle state (when a focal length is the minimum). The telephoto position of the cam groove designates a position where the corresponding cam follower is located when the lens barrel 100 is in a maximum telephoto state (when the focal length is the maximum). An end of the guiding part 62b connected to the introducing part 62a is the retraction position P21, and the other end of the guiding part 62b opposite to the introducing part 62a is the telephoto position P23. The wide-angle position P22 is located between the retraction position P21 and the telephoto position P23 of the guiding part 62b. Second cam followers 22 of the second group unit 20 described later engage with the second cam grooves 62.

The third cam grooves 63 are formed around a midpoint of the inner circumferential surface in the optical axis direction. The third cam grooves 63 are connected to the helicoid grooves 64 through connecting grooves 67. Each of the third cam grooves 63 includes a refraction position P31, a wide-angle position P32, and a telephoto position P33. Each of the connecting grooves 67 is connected to an end of the corresponding third cam groove 63 near the telephoto position P33. The other end of the third cam groove 63 opposite to the connecting groove 67 is the retraction position P31. The wide-angle position P32 is located between the retraction position P31 and the telephoto position P33 of the third cam groove 63. Third cam followers 32 of the third group unit 30 described later engage with the third cam grooves 63.

The internal gear 66 extends along the circumferential direction at the rear end part of the cam frame 60. The internal gear 66 is not provided in the whole inner circumferential surface of the cam frame 60, but is provided only partially in the inner circumferential surface of the cam frame 60. The internal gear 66 extends to a rear edge of the cam frame 60. The internal gear 66 includes a plurality of teeth arranged in the circumferential direction. The internal gear 66 engages with the drive gear 82 of the zoom motor unit 81. The zoom motor unit 81 drives the cam frame 60 to rotate. The internal gear 66 is an example of a gear part.

The fifth cam grooves 65 are provided in a rear part of the cam frame 60. The fifth cam grooves 65 extend forward from the rear edge of the cam frame 60 so that ends thereof are located forward of the internal gear 66. Each of the fifth cam grooves 65 includes an introducing part 65a extending forward from the rear edge of the cam frame 60, and a guiding part 65b continuously extending from the introducing part 65a in a predetermined shape. The guiding part 65b includes a retraction position P51, a wide-angle position P52, and a telephoto position P53. An end of the guiding part 65b connected to the introducing part 65a is the telephoto position P53, and the other end of the guiding part 65b opposite to the introducing part 65a is the refraction position P51. The wide-angle position P52 is located between the retraction position P51 and the telephoto position P53 of the guiding part 65b. Fifth cam followers 52 engage with the fifth cam grooves 65. The fifth cam groove 65 is an example of a cam groove, and the fifth cam follower 52 is an example of a cam follower.

As shown in FIG. 1, the inner frame 70 is substantially cylindrical. The inner frame 70 is fixed to the master flange 80. A flange 74 protrudes outward in the radial direction from a front edge of the inner frame 70. The flange 74 includes translational protrusions 75 protruding outward in the radial direction. The translational protrusions 75 engage with translational grooves formed in an inner circumferential surface of the first group unit 10. As described in detail later, the inner frame 70 supports the fourth group unit 40 to be movable in the optical axis direction, and is contained in the inside of the cam frame 60. The inner frame 70 is an example of a support frame.

Figure 3:
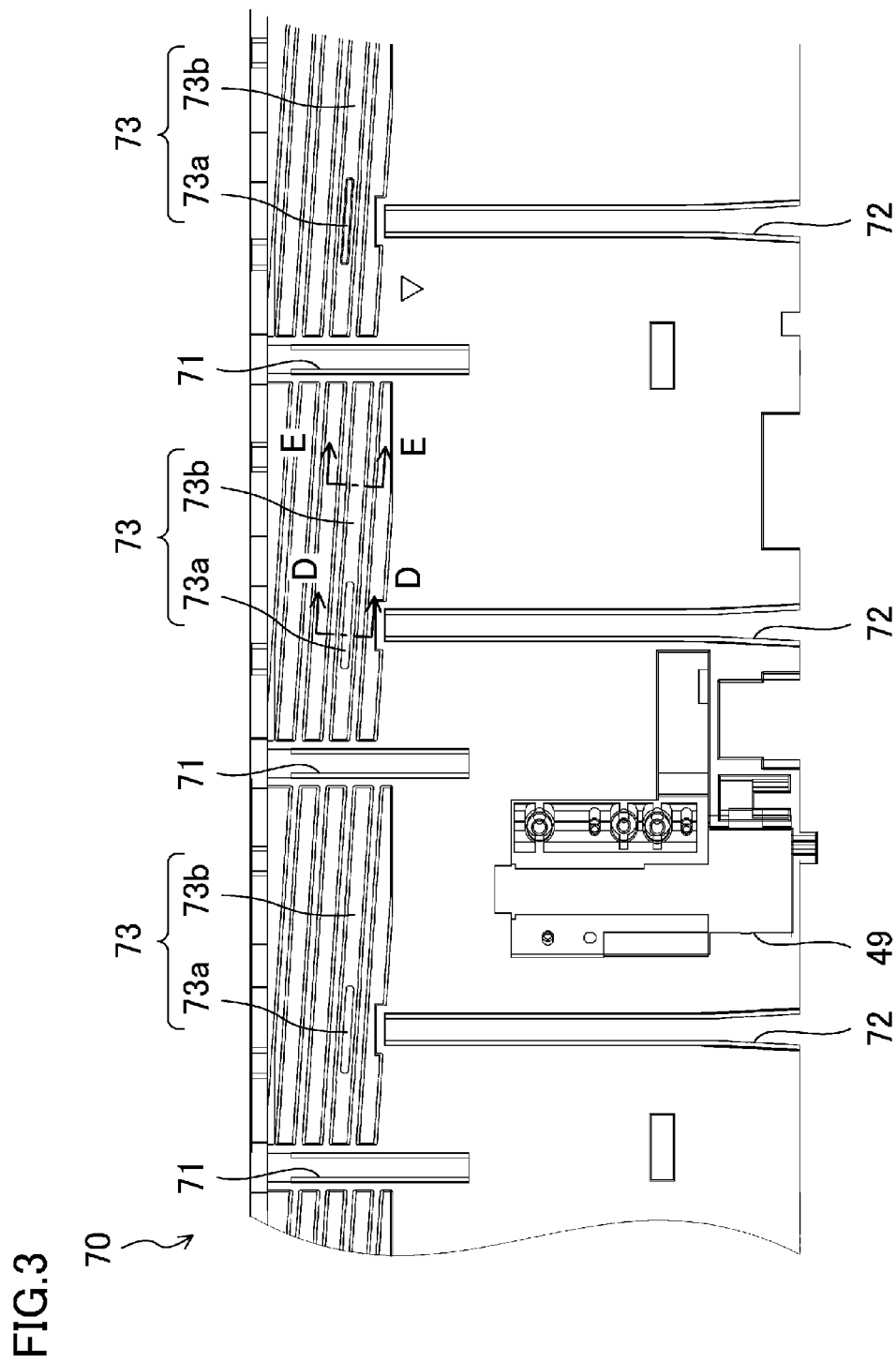
FIG. 3 is a development view of an outer circumferential surface of an inner frame.

FIG. 3 shows a development view of an outer circumferential surface of the inner frame 70. Three helicoid protrusions 73 protruding outward in the radial direction and extending helically along the outer circumferential surface are provided on a front end part of the outer circumferential surface of the inner frame 70. The helicoid protrusions 73 engage with the helicoid grooves 64 of the cam frame 60. Since the cam frame 60 and the inner frame 70 engage with each other through the helicoid grooves 64 and the helicoid protrusions 73, the cam frame 60 moves along the optical axis direction relative to the inner frame 70 when the cam frame 60 rotates.

The inner frame 70 is provided with three first translational grooves 71 and three second translational grooves 72 extending in the optical axis direction. The first translational grooves 71 extend rearward from the front edge of the inner frame 70, and intersect with the helicoid protrusions 73 so that ends thereof are located rearward of the helicoid protrusions 73. The second translational grooves 72 extend forward from a rear edge of the inner frame 70. Front ends of the second translational grooves 72 reach the helicoid protrusion 73. The first translational grooves 71 and the second translational grooves 72 penetrate the inner frame 70 in a direction of a thickness of the inner frame 70. The first translational grooves 71 engage with the second cam followers 22 of the second group unit 20 described later. The second translational grooves 72 engage with the third cam followers 32 of the third group unit 30 described later and the fifth cam followers 52 of the fifth group unit 50 described later.

The focus motor unit 49 is attached to a rear part of the inner frame 70. The focus motor unit 49 includes a lead screw, and a focus motor for driving the lead screw to rotate. The lead screw is connected to a motor shaft of the focus motor. The lead screw is exposed inside of the inner frame 70. The focus motor unit 49 is an example of a second driver.

As shown in FIG. 1, the fourth group unit 40 includes a lens frame 41, and a fourth lens group L4 for focus adjustment held by the lens frame 41. The fourth group unit 40 is an example of a second optical unit. Although not shown, two shafts extending in the optical axis direction are provided in the cam frame 60. The lens frame 41 is held by the shafts to be movable along the optical axis direction. The fourth group unit 40 is driven by the focus motor unit 49 to translate along the optical axis direction.

As shown in FIG. 1, the first group unit 10 includes a substantially cylindrical lens frame 11, and a first lens group L1 for zooming held at a front end part of the lens frame 11. Although not shown, an inner circumferential surface of the first group unit 10 is provided with translational grooves extending in the optical axis direction, and a first cam follower protruding inward in the radial direction. The translational grooves engage with the translational protrusions 75 of the inner frame 70. Thus, the first group unit 10 is able to move along the optical axis direction relative to the inner frame 70, and is unable to rotate in the circumferential direction relative to the inner frame 70. The first cam follower engages with the first cam groove 61 of the cam frame 60. When the cam frame 60 rotates, the first cam follower relatively moves in the first cam groove 61 of the cam frame 60 with the translational grooves of the first group unit 10 engaging with the translational protrusions 75 of the inner frame 70. As a result, the first group unit 10 translates in the optical axis direction relative to the inner frame 70.

As shown in FIG. 1, the second group unit 20 includes a substantially cylindrical lens frame 21, and a second lens group L2 for zooming held at a front end part of the lens frame 21. The lens frame 21 is provided with second cam followers 22 protruding outward in the radial direction. The second cam followers 22 engage with the second cam grooves 62 of the cam frame 60 through the first translational grooves 71 of the inner frame 70. A base end of each of the second cam followers 22 is shaped to engage with the corresponding first translational groove 71. Thus, the second group unit 20 is able to move along the optical axis direction relative to the inner frame 70, and is unable to rotate in the circumferential direction relative to the inner frame 70. When the cam frame 60 rotates, the second cam followers 22 move in the first translational grooves 71 along the shape of the second cam grooves 62. As a result, the second group unit 20 translates in the optical axis direction relative to the inner frame 70.

Figure 4:
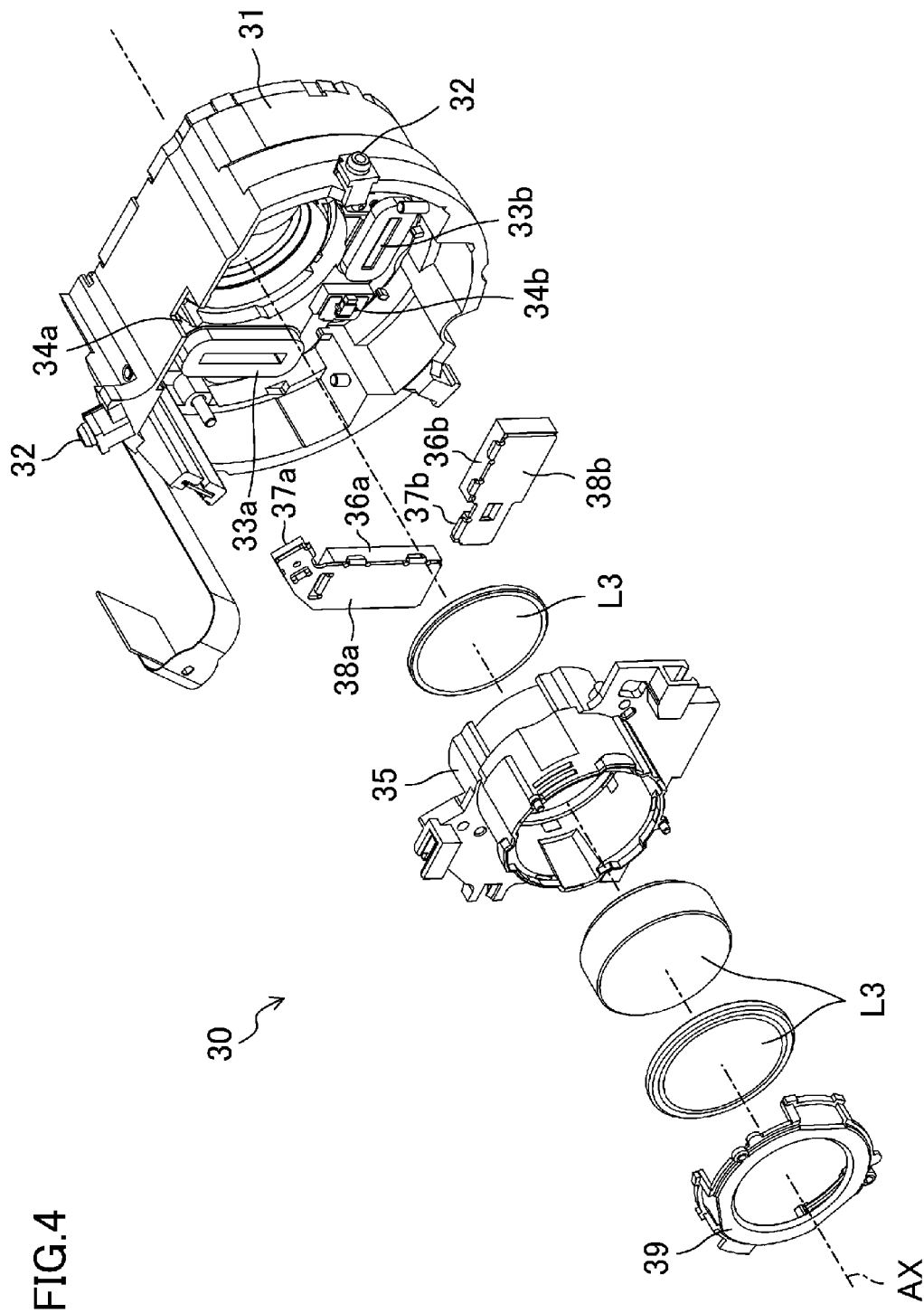
FIG. 4 is an exploded perspective view of a third group unit.

FIG. 4 shows an exploded perspective view of the third group unit 30. The third group unit 30 includes a third frame 31, an optical image stabilization (OIS) lens frame 35, a third lens group L3 for image blur correction held by the OIS lens frame 35, and an image blur correction device for driving the OIS lens frame 35.

The third frame 31 is provided with third cam followers 32 protruding outward in the radial direction. The third cam followers 32 engage with the third cam grooves 63 of the cam frame 60 through the second translational grooves 72 of the inner frame 70. A base end of each of the third cam followers 32 is shaped to engage with the corresponding second translational groove 72. Thus, the third frame 31 is able to move along the optical axis direction relative to the inner frame 70, and is unable to rotate in the circumferential direction relative to the inner frame 70. When the cam frame 60 rotates, the third cam followers 32 move in the second translational grooves 72 in accordance with the shape of the third cam grooves 63. As a result, the third group unit 30 translates in the optical axis direction relative to the inner frame 70.

The third frame 31 holds the OIS lens frame 35 to be movable in a plane orthogonal to the optical axis direction. The OIS lens frame 35 is moved by the image blur correction device in the plane orthogonal to the optical axis direction. The image blur correction device will be described later. A light blocking cap 39 is attached to a front end part of the OIS lens frame 35. The light blocking cap 39 blocks unwanted light around an outer circumference of the third lens group L3 to reduce flare and ghost. The third lens group L3 includes a plurality of lenses, but may include a single lens.

The fifth group unit 50 includes a lens frame 51, and a fifth lens group L5 for zooming held by the lens frame 51. The fifth group unit 50 is an example of a first optical unit. The lens frame 51 of the fifth group unit 50 is provided with fifth cam followers 52 protruding outward in the radial direction. The fifth cam followers 52 engage with the fifth cam grooves 65 of the cam frame 60 through the second translational grooves 72 of the inner frame 70. A base end of each of the fifth cam followers 52 is shaped to engage with the corresponding second translational groove 72. Thus, the fifth group unit 50 is able to move along the optical axis direction relative to the inner frame 70, and is unable to rotate in the circumferential direction relative to the inner frame 70. When the cam frame 60 rotates, the fifth cam followers 52 move in the second translational grooves 72 in accordance with the shape of the fifth cam grooves 65. As a result, the fifth group unit 50 translates in the optical axis direction relative to the inner frame 70. The fifth group unit 50 is the lightest optical unit among the optical units included in the lens barrel 100 and driven by a cam mechanism. Specifically, the fifth group unit 50 is lighter than the first group unit 10, the second group unit 20, and the third group unit 30. Note that the fifth group unit 50 is lighter than the fourth group unit 40.

In the lens barrel 100 configured as described above, the cam frame 60 is rotatable at least from the retraction position to the telephoto position through the wide-angle position. As the cam frame 60 rotates, the first group unit 10, the second group unit 20, the third group unit 30, and the fifth group unit 50 move along the optical axis direction.

Figure 5:
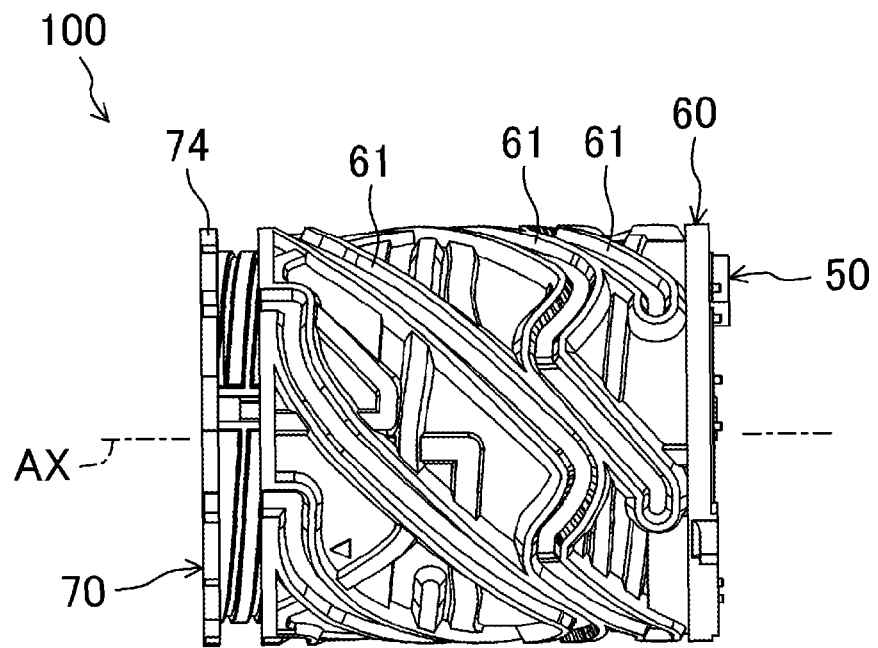
FIG. 5 is a side view of the lens barrel in a retracted state.
Figure 6:
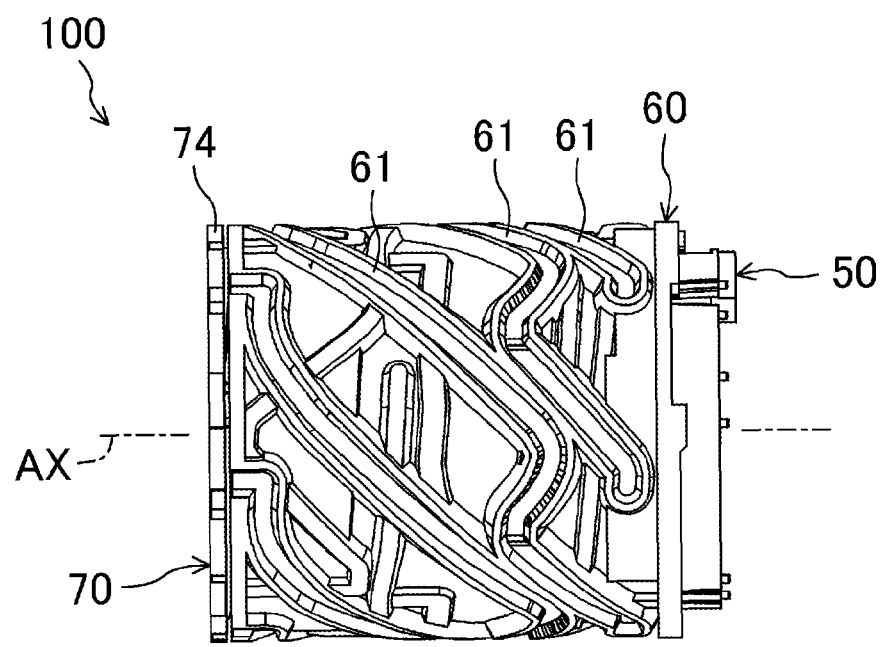
FIG. 6 is a side view of the lens barrel in a maximum telephoto state (at a telephoto end).

FIG. 5 shows a side view of the lens barrel 100 in a retracted state, and FIG. 6 shows a side view of the lens barrel 100 in a telephoto state. In FIGS. 5 and 6, the first group unit 10, the master flange 80, and the imaging device unit 90 are not shown. In the refracted lens barrel 100, the cam frame 60 is located at a relatively rear part of the inner frame 70. Specifically, the rear edge of the cam frame 60 and the rear edge of the inner frame 70 substantially coincide with each other. In this state, the first group unit 10, the second group unit 20, the third group unit 30, and the fifth group unit 50 are located at their refraction positions in the cam frame 60 and the inner frame 70. When the lens barrel 100 is in a shooting state, the first group unit 10, the second group unit 20, the third group unit 30, and the fifth group unit 50 are located at certain positions between the wide-angle positions and the telephoto positions depending on an angle of rotation of the cam frame 60. Zooming is performed by the movement of the first group unit 10, the second group unit 20, the third group unit 30, and the fifth group unit 50 between the wide-angle position and the telephoto position. When the lens barrel 100 is at the telephoto position, the cam frame 60 is located at a relatively front part of the inner frame 70.

The fourth group unit 40 moves along the optical axis direction together with the inner frame 70 in a zooming operation, and is driven by the focus motor unit 49 to move along the optical axis direction relative to the inner frame 70. Thus, focus adjustment is performed.

[2. Assembly of Lens Barrel]

Assembly of the lens barrel 100 will be briefly described below.

First, the third group unit 30 and the fourth group unit 40 are placed in the inner frame 70. Specifically, the third group unit 30 is placed in the inner frame 70 so that the third cam followers 32 engage with the second translational grooves 72. Then, the fourth group unit 40 is placed in the inner frame 70 to engage with the shafts in the inner frame 70. With the fourth group unit 40 contained in the inner frame 70, the focus motor unit 49 is attached to the outer circumferential surface of the inner frame 70. At this time, the lead screw of the focus motor unit 49 engages with a rack 45 of the fourth group unit 40 described later.

Then, the inner frame 70 containing the third group unit 30 and the fourth group unit 40 is placed in the cam frame 60 from the front. Specifically, the inner frame 70 is placed in the cam frame 60 with the third cam followers 32 located at foremost parts of the second translational grooves 72. At this time, the inner frame 70 is placed in the cam frame 60, while relatively rotating the cam frame 60 and the inner frame 70 so that the helicoid protrusions 73 of the inner frame 70 and the helicoid grooves 64 of the cam frame 60 engage with each other. The third cam followers 32 move in the helicoid grooves 64 together with the helicoid protrusions 73.

Then, after the inner frame 70 and the cam frame 70 are relatively rotated until the inner frame 70 is inserted to the depth of the cam frame 60, the third group unit 30 is pushed rearward. When the inner frame 70 is inserted to the depth of the cam frame 60, each of the third cam followers 32 reaches a junction with the connecting groove 67 beyond the telephoto position of the helicoid groove 64. In this state, the third group unit 30 is pushed rearward in the optical axis direction to allow the third cam follower 32 to enter the connecting groove 67, and to reach the third cam groove 63.

Then, the cam frame 60 and the inner frame 70 are relatively rotated to align the introducing parts 62a of the second cam grooves 62 of the cam frame 60 with the first translational grooves 71 of the inner frame 70 in the circumferential direction. In this state, the second group unit 20 is placed in the inner frame 70 so that the second cam followers 22 engage with the first translational grooves 71. At this time, the second cam followers 22 are inserted in the second cam grooves 62.

Then, the cam frame 60 and the inner frame 70 are relatively rotated to align the introducing parts 65a of the fifth cam grooves 65 of the cam frame 60 with the second translational grooves 72 of the inner frame 70 in the circumferential direction. In this state, the fifth group unit 50 is placed in the inner frame 70 so that the fifth cam followers 52 engage with the second translational grooves 72. At this time, the fifth cam followers 52 are also inserted in the fifth cam grooves 65. Thus, in the assembly process, the fifth group unit 50 (the lens frame 51) is incorporated in the cam frame 60 after incorporation of the fourth group unit 40 (the lens frame 41) and the inner frame 70.

Then, the first group unit 10 is fitted on the outer circumferential surface of the cam frame 60 so that the first cam follower engages with the first cam groove 61 of the cam frame 60, and the translational protrusions of the inner frame 70 engage with the translational grooves.

With the first group unit 10, the second group unit 20, the third group unit 30, the fourth group unit 40, the fifth group unit 50, the cam frame 60, and the inner frame 70 assembled in one piece, the inner frame 70 is attached to the master flange 80 to which the zoom motor unit 81 has been attached in advance. The drive gear 82 of the zoom motor unit 81 is brought into engagement with the internal gear 66 of the cam frame 60.

Finally, the imaging device unit 90 is attached to the master flange 80.

The lens barrel 100 is assembled in this way. With the cam frame 60 and the inner frame 70 engaged with each other by a helicoid mechanism including the helicoid grooves 64 and the helicoid protrusions 73, the lens barrel 100 can be provided with improved ease of assembly, and improved strength.

The above-described assembly process is merely an example, and the assembly of the lens barrel 100 is not limited thereto. The lens barrel 100 may be assembled in a different order as long as the lens barrel 100 can properly be assembled.

[3. Details of Structure]

[3-1. Cam Frame 60]

[3-1-1. Fifth Cam Groove 65 and Internal Gear 66]

Figure 7:
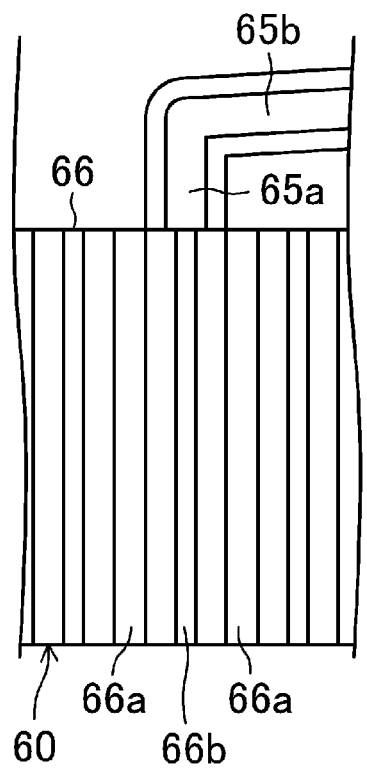
FIG. 7 is an enlarged view of a part circled with a dash-dot-dot line VII in FIG. 2.
Figure 8:
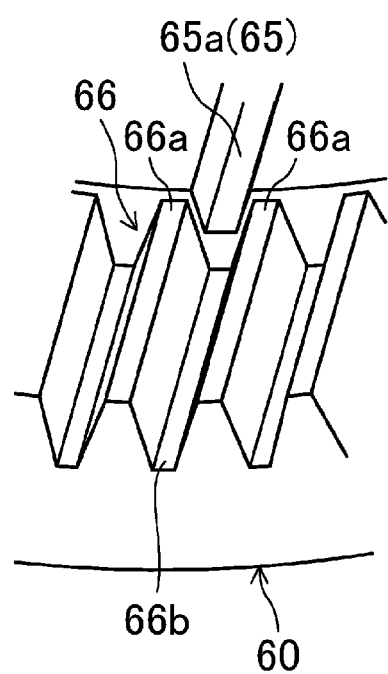
FIG. 8 is an enlarged perspective view of an internal gear and a fifth cam groove.
Figure 9:
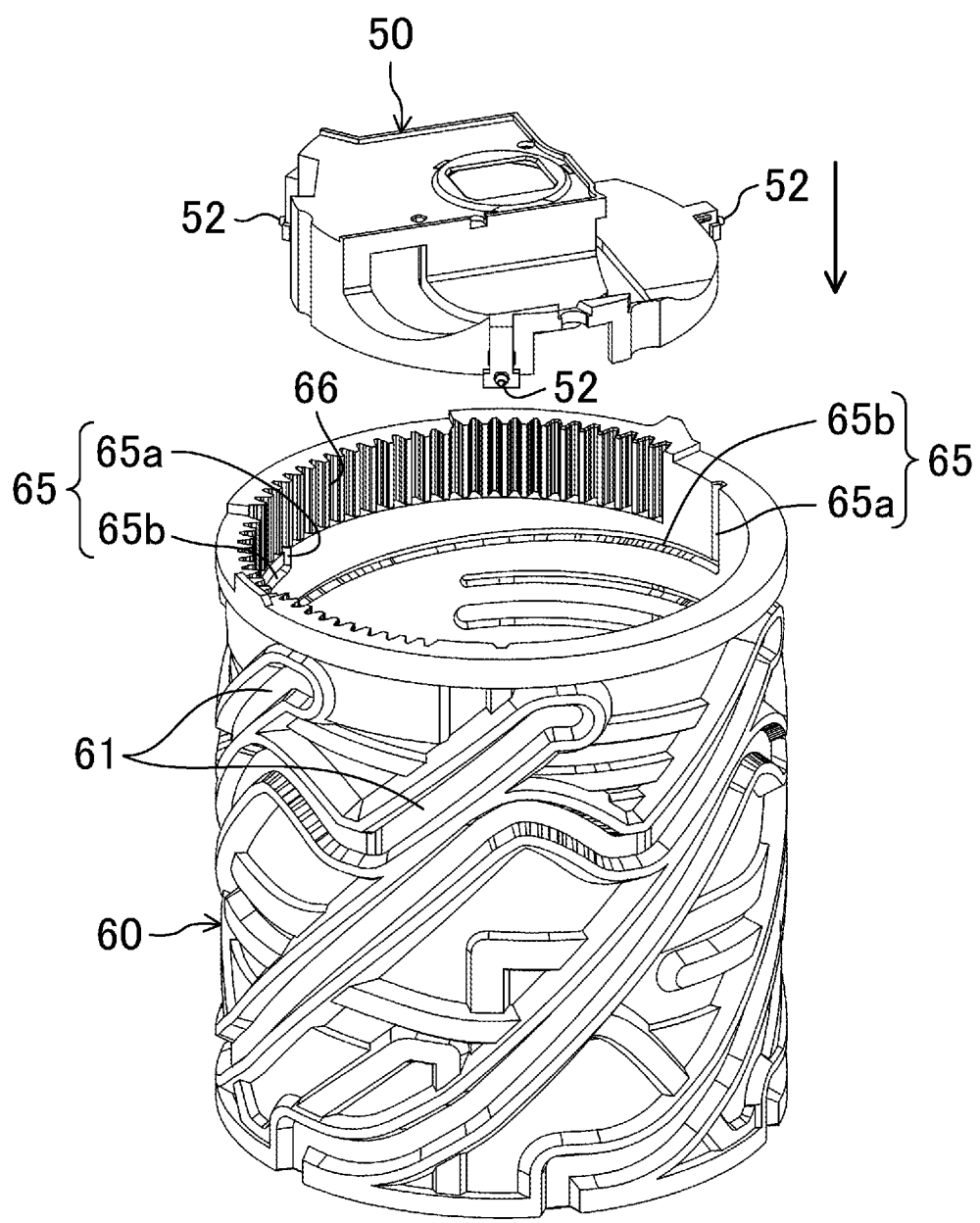
FIG. 9 is a perspective view of a fifth group unit and a cam frame.
Figure 10:
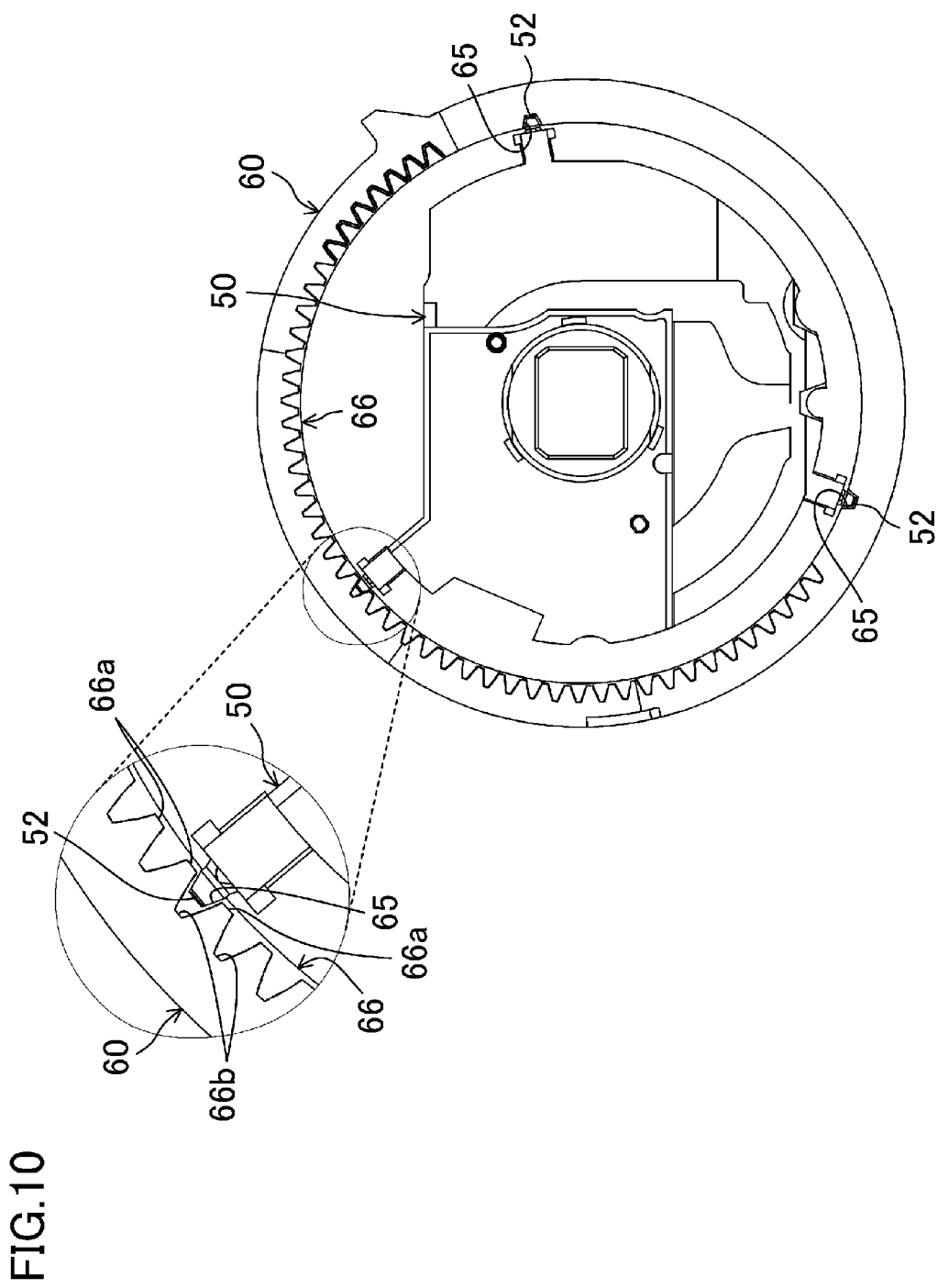
FIG. 10 shows a back view and a partially enlarged view of the fifth group unit inserted in the cam frame.

FIG. 7 shows an enlarged view of a part circled with a dash-dot-dot line VII in FIG. 2. FIG. 8 shows an enlarged perspective view of the internal gear 66 and the fifth cam groove 65. FIG. 9 shows a perspective view of the fifth group unit 50 and the cam frame 60. FIG. 10 shows a back view and a partially enlarged view of the fifth group unit 50 inserted in the cam frame 60. In FIGS. 9 and 10, the inner frame 70 is not shown.

As shown in FIG. 2, each of the fifth cam grooves 65 includes a guiding part 65b having a refraction position P51, a wide-angle position P52, and a telephoto position P53 for the fifth cam follower 52, and an introducing part 65a continuously extending from the guiding part 65b. The introducing part 65a is opened at the rear edge of the cam frame 60. The fifth group unit 50 is inserted in the cam frame 60 from the rear edge of the cam frame 60 to be contained in the cam frame 60. At this time, the fifth cam follower 52 is inserted in the introducing part 65a of the fifth cam groove 65 from the rear edge of the cam frame 60.

The internal gear 66 is provided at part of the rear end part of the inner circumferential surface of the cam frame 60 in the circumferential direction. In part of the rear end part of the inner circumferential surface of the cam frame 60 where the internal gear 66 is not provided, the introducing part 65a extends to the rear edge of the cam frame 60. In the part of the rear end part where the internal gear 66 is provided, the introducing part 65a needs to cross the internal gear 66 to extend to the rear edge of the cam frame 60. If the internal gear 66 is partially cut by the introducing part 65a so that the introducing part 65a crosses the internal gear 66, the internal gear 66 and the drive gear 82 of the zoom motor unit 81 may cause backlash, and the strength of the internal gear 66 may decrease.

In view of the foregoing, the introducing part 65a is designed to extend continuously from a single tooth space 66b of the internal gear 66. Specifically, the internal gear 66 includes a plurality of teeth 66a aligned in the circumferential direction. A tooth space 66b extending in the optical axis direction is formed between two adjacent teeth 66a. The position of the introducing part 65a coincides with the position of the single tooth space 66b in the circumferential direction. Thus, the introducing part 65a extends continuously from the tooth space 66b. Thus, the tooth space 66b of the internal gear 66 functions as part of the fifth cam groove 65. In other words, the tooth space 66b of the internal gear 66 constitutes part of the fifth cam groove 65. In the part where the internal gear 66 is provided, the fifth cam follower 52 enters the introducing part 65a through the tooth space 66b of the internal gear 66.

To achieve the above-described structure, the fifth cam follower 52 is dimensioned smaller than the tooth space 66b to pass through the tooth space 66b. Specifically, when the fifth cam follower 52 and the tooth space 66b are cut along a plane orthogonal to a direction in which the fifth cam follower 52 travels, i.e., the optical axis direction, the fifth cam follower 52 has a smaller cross-section than the tooth space 66b. More specifically, the fifth cam follower 52 is dimensioned to be short so that the fifth cam follower 52 does not reach the bottom of the tooth space 66b. A width of the fifth cam follower 52 is smaller than a width of the tooth space 66b through the entire depth of the tooth space 66b.

In this structure, even if the cam frame 60 is provided with the internal gear 66, the fifth cam follower 52 can cross the internal gear 66 to enter the guiding part 65b of the fifth cam groove 65. Thus, there is no need to shift the position of the fifth cam groove 65 from the internal gear 66. This can improve design flexibility of the fifth cam grooves 65, and can downsize the lens barrel 100.

When the fifth cam follower 52 cannot cross the internal gear 66, the introducing part 65a of the fifth cam groove 65 needs to extend to the front edge of the cam frame 60 so that the fifth group unit 50 is inserted in the cam frame 60 from the front side of the cam frame 60. Such limitation on the position of the introducing part 65a decreases the design flexibility of the fifth cam grooves 65, and decreases design flexibility of the other cam grooves formed in the cam frame 60. Further, limitation on the direction along which the fifth group unit 50 is inserted in the cam frame 60 may limit the order of the assembly of the lens barrel 100, and may decrease the design flexibility of the lens barrel 100 in some cases. In particular, in the present embodiment, the fifth group unit 50 is the rearmost optical unit among the optical units contained in the cam frame 60. Thus, in view of the ease of the assembly, the fifth group unit 50 is inserted in the cam frame 60 from the rear side of the cam frame 60. The fifth cam follower 52 is simultaneously inserted in the fifth cam groove 65 of the cam frame 60 and the second translational groove 72 of the inner frame 70. Thus, in inserting the fifth group unit 50 in the cam frame 60, the inner frame 70 needs to be inserted in the cam frame 60 in advance. Before inserting the inner frame 70 in the cam frame 60, the fourth group unit 40, which is a focus unit movable independently of the cam mechanism, needs to be contained in the inner frame 70 in advance. Specifically, in inserting the fifth group unit 50 in the cam frame 60, the inner frame 70 has been contained in the cam frame 60, and the fourth group unit 40 has been contained in the inner frame 70. Thus, the fifth group unit 50 cannot be inserted in the cam frame 60 from any other directions but the rear side. The configuration in which the fifth group unit 50 is insertable in the cam frame 60 from the rear side can provide the lens barrel 100 with the above-described structure.

Since the fifth cam follower 52 is made smaller than the tooth space 66b of the internal gear 66, the internal gear 66 is not modified even when the fifth cam follower 52 is configured to cross the internal gear 66. Specifically, the tooth space 66b continuous with the fifth cam groove 65 have the same shape as the other tooth spaces 66b. This can reduce the backlash between the internal gear 66 and the drive gear 82, and can maintain the strength of the internal gear 66. Further, the internal gear 66 can be designed in view of the relationship with the drive gear 82, etc. irrespective of the fifth cam grooves 65.

When viewed in a direction along which the fifth cam follower 52 travels, i.e., in the optical axis direction, the introducing part 65a is made smaller than the tooth space 66b of the internal gear 66. Specifically, when cut along a plane orthogonal to the optical axis AX, the introducing part 65a is smaller than tooth space 66b. For example, a depth of the introducing part 65a is smaller than a depth of the tooth space 66b, and a width of the introducing part 65a is smaller than a width of the tooth space 66b through the entire depth of the introducing part 65a. The fifth cam groove 65 is made smaller than the tooth space 66b as well as the fifth cam follower 52 is made smaller than the tooth space 66b. Thus, even if the fifth cam follower 52 is smaller than the tooth space 66b of the internal gear 66, the fifth cam follower 52 and the fifth cam groove 65 can suitably engage with each other, and backlash can be reduced in guiding the fifth cam follower 52 along the fifth cam groove 65.

A base end (a root) of the fifth cam follower 52 has the smallest transverse cross-sectional area (a cross-sectional area of the fifth cam follower 52 cut along a plane orthogonal to an axial center thereof) among base ends of the cam followers of the other optical units contained in the lens barrel 100 and driven by the cam mechanism (e.g., a lens unit and an aperture unit). Specifically, the transverse cross-sectional area of the base end of the fifth cam follower 52 is smaller than the transverse cross-sectional areas of the base ends of the first cam follower, the second cam followers 22, and the third cam followers 32.

The fifth group unit 50 is the lightest optical unit among the optical units contained in the lens barrel 100 and driven by the cam mechanism (e.g., a lens unit and an aperture unit). Specifically, the fifth group unit 50 is lighter than the first group unit 10, the second group unit 20, and the third group unit 30.

Since the fifth group unit 50 is light, break of the fifth cam follower 52 upon impact on the fifth group unit 50 can be prevented even if the fifth cam follower 52 is thinned. For example, when the lens barrel 100 is dropped and impact is exerted on the lens barrel 100, the impact is exerted on the fifth cam follower 52 due to an inertial force, etc. of the fifth group unit 50. However, since the fifth group unit 50 is light, the impact exerted on the fifth cam follower 52 is small. Thus, the break of the fifth cam follower 52 can be prevented even when the fifth cam follower 52 is narrowed to allow the fifth cam follower 52 to pass through the tooth space 66b of the internal gear 66.

In the fifth cam groove 65, a distance from the rear edge of the cam frame 60 monotonously increases from the telephoto position P53 to the wide-angle position P52. An angle of inclination of part of the fifth cam groove 65 inclined the most with respect to the circumferential direction (may be referred to as a "maximum angle of inclination") is the smallest as compared with the cam grooves of the optical units contained in the lens barrel 100 and driven by the cam mechanism. Specifically, the fifth cam groove 65 has the gentlest inclination with respect to the circumferential direction. An amount of change in angle of inclination with respect to the circumferential direction, represented as a ratio of a displacement in the optical axis direction relative to a displacement in the circumferential direction, is the largest in part of the fifth cam groove 65 between the wide-angle position P52 and the telephoto position P53, and the largest amount of change in angle of inclination (may be referred to as a "maximum amount of change") is the smallest as compared with the cam grooves of the optical units contained in the lens barrel 100 and driven by the cam mechanism.

Specifically, a movement of the fifth cam follower 52 in the optical axis direction relative to an amount of rotation of the cam frame 60 is small, and a variation thereof is also small. That is, when the lens frame 51 is being driven by the cam mechanism, a force applied to the fifth cam follower 52 by the fifth cam groove 65 is small. Thus, even when the fifth cam follower 52 is narrowed, the lens frame 51 can be driven by the cam mechanism without breaking the fifth cam follower 52.

The fifth cam follower 52 is in the shape of a truncated cone, i.e., tapered. A tooth plane of each of the teeth 66a is formed along an involute curve, and the tooth space 66b is designed to decrease in width with decreasing distance from its bottom. An angle of inclination of the tapered fifth cam follower 52 relative to the radial direction is approximately the same as an angle of inclination of the tooth space 66b relative to the radial direction, i.e., a standard pressure angle of the tooth 66a (e.g., 20°).

Therefore, even when the fifth cam follower 52 is designed smaller than the tooth space 66b, a vertical cross-sectional area of the fifth cam follower 52 (a cross-sectional area of the fifth cam follower 52 cut along a plane including an axial center of the fifth cam follower 52) can be increased, thereby preventing the break of the fifth cam follower 52.

[3-1-2. Second Cam Groove 62]

As shown in FIG. 2, the second cam grooves 62 extend obliquely forward from the refraction position P21 to the wide-angle position P22, and extend obliquely rearward from the wide-angle position P22 to the telephoto position P23. The refraction position P21 and the telephoto position P23 are located at substantially the same point in the optical axis direction. However, in a strict sense, the retraction position P21 is located between the wide-angle position P22 and the telephoto position P23 in the optical axis direction. Specifically, the retraction position P21 is located forward of the telephoto position P23 in the optical axis direction. Part of the second cam groove 62, specifically, part of the second cam groove 62 near the telephoto position P23, extends behind the retraction position P21 of the adjacent second cam groove 62. Specifically, since the retraction position P21 is located forward of the telephoto position P23 in the optical axis direction, the two adjacent second cam grooves 62 do not intersect with each other, and are partially aligned in the optical axis direction.

In the lens barrel 100, the position of the second group unit 20 in the retracted state and the position of the second group unit 20 in the telephoto state are substantially the same in the optical axis direction. If the cam frame 60 does not move back and forth in the optical axis direction, and the second cam grooves 62 are designed long, the adjacent second cam grooves 62 may intersect with each other. In such a case, the second cam follower 22 cannot move correctly along the second cam groove 62 in crossing the intersection. To avoid this trouble, the second cam grooves 62 can be shortened. However, in this case, an angle of rotation of the cam frame 60 from the wide-angle position to the telephoto position is reduced, and an angle of inclination of the second cam groove 62 relative to the circumferential direction is increased. This requires increase in output torque of the zoom motor 83.

In contrast, since the cam frame 60 is allowed to move in the optical axis direction during rotation, the intersection of the second cam grooves 62 can be avoided, and the second cam grooves 62 can be elongated to increase the angle of rotation of the cam frame 60, even if the position of the second group unit 20 in the retracted state and the position of the second group unit 20 in the telephoto state are substantially the same. This can reduce the output torque of the zoom motor 83. As a result, the zoom motor unit 81 can be downsized, and the lens barrel 100 can also be downsized.

[3-1-3. Second Cam Groove 62 and Helicoid Groove 64]

Figure 11:
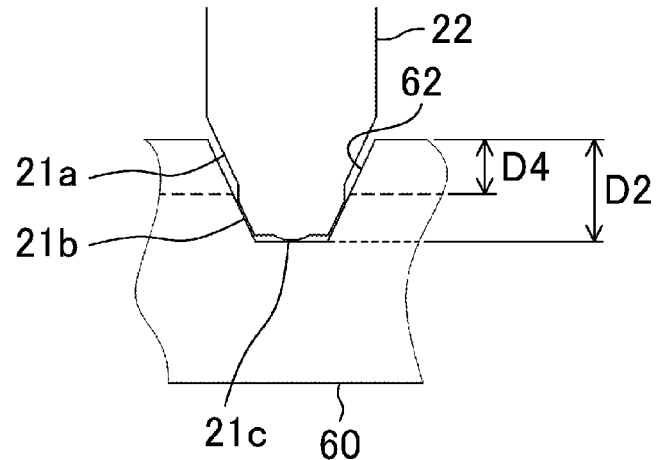
FIG. 11 is a cross-sectional view of a second cam groove taken along the line A-A in FIG. 2.
Figure 12:
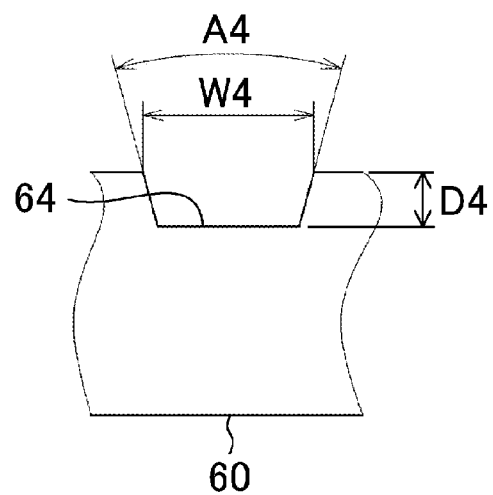
FIG. 12 is a cross-sectional view of a helicoid groove taken along the line B-B in FIG. 2.

FIG. 11 is a cross-sectional view of the second cam groove 62 cut along the line A-A in FIG. 2. FIG. 12 is a cross-sectional view of the helicoid groove 64 cut along the line B-B in FIG. 2. FIG. 11 shows the second cam follower 22 in cross-section.

As shown in FIG. 2, in the cam frame 60, the helicoid grooves 64 and the second cam grooves 62 intersect with each other. The second cam grooves 62 also intersect with the connecting grooves 67. As shown in FIGS. 11 and 12, a depth D2 of the second cam groove 62 is larger than a depth D4 of the helicoid groove 64. The second cam follower 22 engages with part of the second cam groove 62 deeper than the helicoid groove 64. Thus, backlash between the second cam follower 22 and the second cam groove 62 can be reduced.

Specifically, in a structure where a cam groove intersects with another cam groove, the two cam grooves split each other at the intersection, and sidewalls of the cam grooves are not present at the intersection. Thus, the cam follower and the cam groove cause backlash at the intersection. In contrast, in the structure where the second cam groove 62 is deeper than the helicoid groove 64, the second cam groove 62 is not completely split by the helicoid groove 64 and the connecting groove 67 even at the intersection between the second cam groove 62 and the helicoid groove 64, and the sidewalls remain in part of the second cam groove 62 near its bottom. Thus, the second cam follower 22 can be guided by the second cam groove 62 even at the intersection between the second cam groove 62 and the helicoid groove 64.

Moreover, the second cam follower 22 has a stepped cross-section so that the second cam follower 22 slides only on part of the second cam groove 62 deeper than the helicoid groove 64. Specifically, the sidewalls of the second cam groove 62 are inclined so that the width of the second cam groove 62 decreases with decreasing distance to its bottom. The second cam follower 22 is basically tapered to be substantially in the shape of a truncated cone. The second cam follower 22 has a side surface including a first side surface 21a, and a second side surface 21b closer to a tip end of the second cam follower 22 than the first surface 21a. The first surface 21a and the second surface 21b are inclined to have substantially the same angle of inclination of the sidewall of the second cam groove 62. However, at a connecting part between the first surface 21a and the second surface 21b, the second surface 21b expands radially outward compared with the first surface 21a. Specifically, the first surface 21a and the second surface 21b are not flush with each other, and form a stepped part between them. The second surface 21b slides on part of the second cam groove 62 deeper than the helicoid groove 64, and does not slide on part of the second cam groove 62 corresponding to the entire depth of the helicoid groove 64. The first surface 21a faces the part of the second cam groove 62 corresponding to the entire depth of the helicoid groove 64 with a gap interposed therebetween. That is, only the second surface 21b closer to the tip end of the second cam follower 22 slides on the part of the second cam groove 62 closer to its bottom and deeper than the helicoid groove 64. At the intersection between the second cam groove 62 and the helicoid groove 64, the helicoid groove 64 splits part of the second cam groove 62 corresponding to the entire depth of the helicoid groove 64, and the sidewalls of the part of the second cam groove 62 are not present. Thus, when the second cam follower 22 slides on the part of the second cam groove 62 corresponding to the helicoid groove 64, the second cam follower 22 may be caught on a ridge formed by the second cam groove 62 and the helicoid groove 64 at the intersection. This may cause unwanted vibration and image blur in a zooming operation. In contrast, when the second cam follower 22 does not slide on the part of the second cam groove 62 corresponding to the depth of the helicoid groove 64, but slides only on the part of the second cam groove 62 deeper than the helicoid groove 64, the second cam follower 22 can be prevented from being caught on the ridge formed by the second cam groove 62 and the helicoid groove 64. This can reduce unwanted vibration and image blur in the zooming operation.

A projection 21c is provided at the tip end of the second cam follower 22. The projection 21c slides on the bottom of the second cam groove 62 to reduce sliding friction between the second cam follower 22 and the second cam groove 62.

Since a shallower one of two intersecting grooves is formed by the helicoid groove 64 having a constant angle of inclination, and a part engaging with the helicoid groove 64 is formed by the helicoid protrusion 73 extending in the longitudinal direction of the helicoid groove 64, backlash between the helicoid groove 64 and the helicoid protrusion 73 can be reduced even when part of the helicoid groove 64 is split by the second cam groove 62. Specifically, the helicoid protrusion 73 extends in the longitudinal direction of the helicoid groove 64. More specifically, a dimension of the helicoid protrusion 73 in the longitudinal direction of the helicoid groove 64 is larger than a dimension of the second cam groove 62 in the longitudinal direction of the helicoid groove 64. Thus, when the helicoid protrusion 73 crosses the intersection between the helicoid groove 64 and the second cam groove 62, at least part of the helicoid protrusion 73 surely engages with the helicoid groove 64. That is, the helicoid protrusion 73 is always guided by the helicoid groove 64. Thus, the backlash between the helicoid groove 64 and the helicoid protrusion 73 can be reduced.

A relationship between the second cam grooves 62 and the connecting grooves 67 is similar to the relationship between the second cam grooves 62 and the helicoid grooves 64. The depth D2 of the second cam groove 62 is larger than a depth of the connecting groove 67. The second cam follower 22 slides only on part of the second cam groove 62 deeper than the connecting groove 67, and does not slide on part of the second cam groove 62 at the same depth as the connecting groove 67.

The connecting groove 67 is also split by the second cam groove 62. However, the third cam follower 32 passes through the connecting groove 67 only in assembling the lens barrel 100. Thus, backlash between the third cam follower 32 and the connecting groove 67, if it occurs, does not cause any problem in use of the lens barrel 100.

Thus, the second cam grooves 62 are designed to intersect with the helicoid grooves 64 and the connecting grooves 67 so that an area of the cam frame 60 can effectively be used to arrange the cam grooves, etc. In particular, the length of the cam frame 60 in the optical axis direction can advantageously be used. Even if the length of the cam frame 60 in the optical axis direction is unchanged, sufficient strokes of the cams are ensured, and a dimension of the retracted lens barrel 100 in the optical axis direction can be reduced.

[3-1-4. Third Cam Groove 63 and Helicoid Groove 64]

The third cam groove 63 and the helicoid groove 64 are connected through the connecting groove 67. Thus, the third cam follower 32 can be introduced to the third cam groove 63 through the helicoid groove 64. This structure can eliminate the introducing part for introducing the third cam follower 32 to the third cam groove 63. This can improve the design flexibility of the cam grooves, etc. of the cam frame 60, and can downsize the lens barrel 100.

Both of the third cam groove 63 and the helicoid groove 64 are grooves along which the third cam follower 32 travels. However, the third cam groove 63 and the helicoid groove 64 have different shapes.

Figure 13:
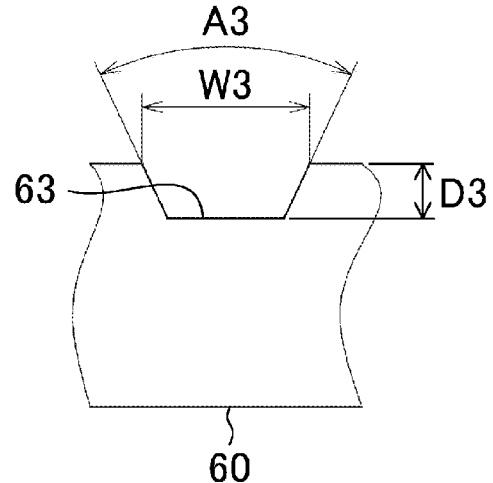
FIG. 13 is a cross-sectional view of a third cam groove taken along the line C-C in FIG. 2.

Specifically, FIG. 13 shows a cross-sectional view of the third cam groove 63 taken along the line C-C in FIG. 2. A width W4 of an open end of the helicoid groove 64 at the surface of the cam frame 60 is larger than a width W3 of an open end of the third cam groove 63 at the surface of the cam frame 60. Sidewalls of the helicoid groove 64 and sidewalls of the third cam groove 63 are inclined. An angle A4 formed by the two sidewalls of the helicoid groove 64 is smaller than an angle A3 formed by the two sidewalls of the third cam groove 63. A depth D3 of the third cam groove 63 is the same as a depth D4 of the helicoid groove 64.

When the angle formed by the two sidewalls of the cam groove is made smaller, backlash of the cam follower in the optical axis direction can be reduced more easily, and the cam follower is not easily detached from the cam groove upon receiving an external force. Thus, for reduced backlash and improved resistance to the external force, the angle formed by the two sidewalls is preferably small.

When the cam frame 60 is an injection-molded resin item, and the angle formed by the two sidewalls of the cam groove is too small, the cam frame 60 cannot easily be molded. Like the helicoid groove 64, when a cam groove has a small angle of inclination relative to the circumferential direction, and the angle does not greatly vary, the cam groove can be molded easily even when the angle formed by the two sidewalls is small. However, like the third cam groove 63, when a cam groove has an angle of inclination which greatly varies relative to the circumferential direction, the cam groove cannot easily be molded when the angle formed by the two sidewalls is small.

Under the circumstances, the helicoid groove 64 which tends to receive great impact is designed to have a relatively small angle formed by the two sidewalls, and the third cam groove 63 of a more complicated shape is designed to have a relatively large angle formed by the two sidewalls.

More specifically, when the lens barrel 100 is dropped and impact is exerted on the lens barrel 100, an external force is applied to the outermost first group unit 10 in most cases. The first group unit 10 is directly coupled to the cam frame 60 and the inner frame 70, and relatively large impact is applied to the helicoid grooves 64 and the helicoid protrusions 73. Since the cam frame 60 and the inner frame 70 are relatively heavy, impact applied to the helicoid grooves 64 and the helicoid protrusions 73 due to an inertial force of the cam frame 60 and the inner frame 70 is relatively large. Thus, the resistance of the helicoid grooves 64 and the helicoid protrusions 73 against the external force is improved by making the angle A4 formed between the two sidewalls of the helicoid groove 64 relatively small.

The third group unit 30 is located relatively inside the lens barrel 100, and the external force applied to the first group unit 10 is not directly applied to the third group unit 30. Further, the third group unit 30 is relatively light, and impact applied to the third cam grooves 63 and the third cam followers 32 due to an inertial force of the third group unit 30 is relatively small. Thus, the need for reducing the angle A3 formed by the two sidewalls of the third cam groove 63 is not so great. For these reasons, greater importance is placed on the ease of molding of the third cam grooves 63 than on reducing the possibility of detachment of the third cam followers 32, and the angle A3 formed by the two sidewalls of the third cam grooves 63 is made relatively large. This allows easy molding of the third cam grooves 63.

In addition, the width W4 of the helicoid groove 64 is made larger than the width W3 of the third cam groove 63. Since the angle A4 formed by the two sidewalls of the helicoid groove 64 is smaller than the angle A3 formed by the two sidewalls of the third cam groove 63, a width of the bottom of the helicoid groove 64 is larger than a width of the bottom of the third cam groove 63. Thus, the helicoid groove 64 is made larger in width than the third cam groove 63 through the entire depth of the helicoid groove 64 from the surface of the cam frame 60 to the bottom of the helicoid groove 64. The third cam follower 32 formed to engage with the third cam groove 63 can smoothly pass through the helicoid groove 64 to be guided to the third cam groove 63 through the helicoid groove 64.

As shown in FIG. 2, a circumferential dimension of the third cam groove 63 is larger than a circumferential dimension of the second cam groove 62. Specifically, an angle of rotation R3 of the cam frame 60 when the third cam follower 32 moves from the retraction position P31 of the third cam groove 63 to a junction with the connecting groove 67 is larger than an angle of rotation R2 of the cam frame 60 when the second cam follower 22 moves from the retraction position P21 to the telephoto position P23 of the second cam groove 62. Specifically, the third cam groove 63 extends from the retraction position P31 to the telephoto position P33, and extends beyond the telephoto position P33 to be connected to the connecting groove 67. Thus, when the cam frame 60 is rotated to the telephoto position, the third cam follower 32 remains at the telephoto position P33 of the third cam groove 63, and does not reach the connecting groove 67. That is, returning of the third cam follower 32 to the helicoid groove 64 is prevented.

[3-2 Inner Frame 70]

Figure 14:
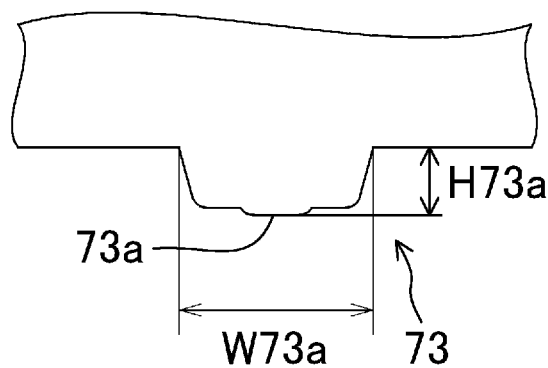
FIG. 14 is a cross-sectional view of a helicoid protrusion taken along the line D-D in FIG. 3.
Figure 15:
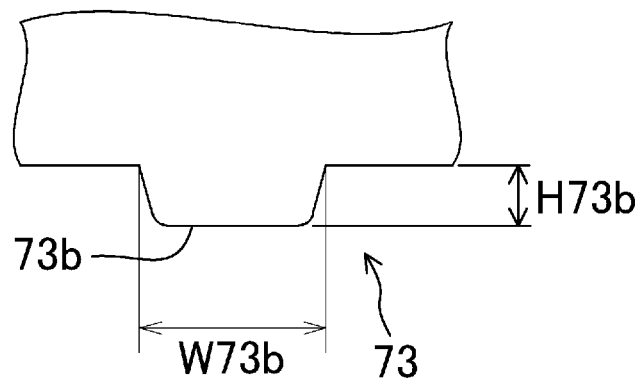
FIG. 15 is a cross-sectional view of the helicoid protrusion taken along the line E-E in FIG. 3.

FIG. 14 shows a cross-sectional view of the helicoid protrusion 73 taken along the line D-D in FIG. 3. FIG. 15 shows a cross-sectional view of the helicoid protrusion 73 taken along the line E-E in FIG. 3. The helicoid protrusion 73 includes a contact part 73a contacting the bottom of the helicoid groove 64, and a reinforcing part 73b for reinforcing the contact part 73a.

The contact part 73a is wider than the reinforcing part 73b, and protrudes outward in the radial direction. Specifically, a height H73a of the contact part 73a is larger than a height H73b of the reinforcing part 73b. A width W73a of the contact part 73a is larger than a width W73b of the reinforcing part 73b. Thus, when the cam frame 60 rotates relative to the inner frame 70, the reinforcing part 73b does not engage with the helicoid groove 64, and the contact part 73a engages with the helicoid groove 64. When the lens barrel 100 is dropped and an external force is applied to the lens barrel 100, the reinforcing part 73b can engage with the helicoid groove 64. This can prevent break of the helicoid protrusion 73. In this structure, basically, there is no need for engaging the reinforcing part 73*b* with the helicoid groove 64, and only the contact part 73*a* engages with the helicoid groove 64. This can improve design accuracy.

[3-3. Fourth Group Unit 40 and Fifth Group Unit 50]

Details of the fourth group unit 40 and the fifth group unit 50 will be described below. In particular, a relationship between each of the fourth and fifth group units 40 and 50 and the zoom motor unit 81 will be described below.

Figure 16:
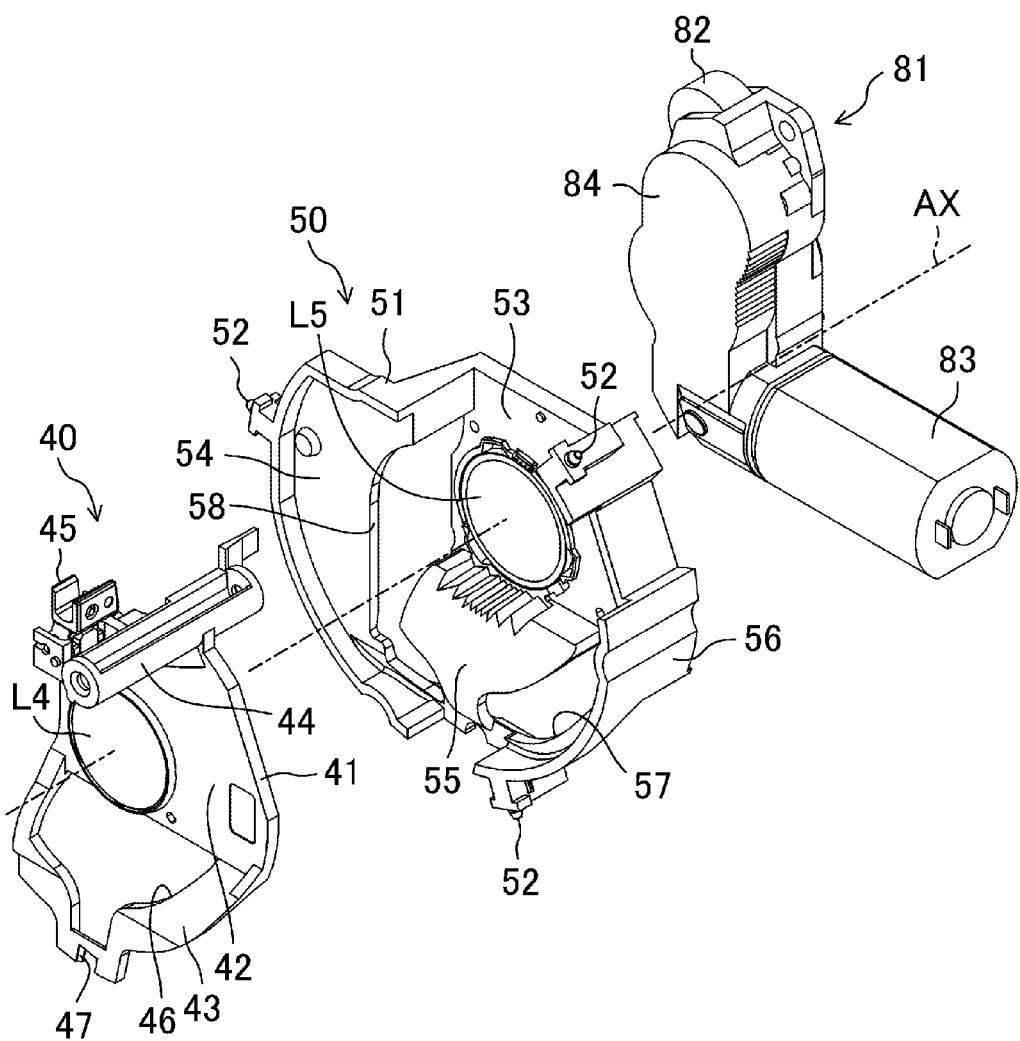
FIG. 16 is a perspective view of a fourth group unit, a fifth group unit, and a zoom monitor unit spaced from each other.
Figure 17:
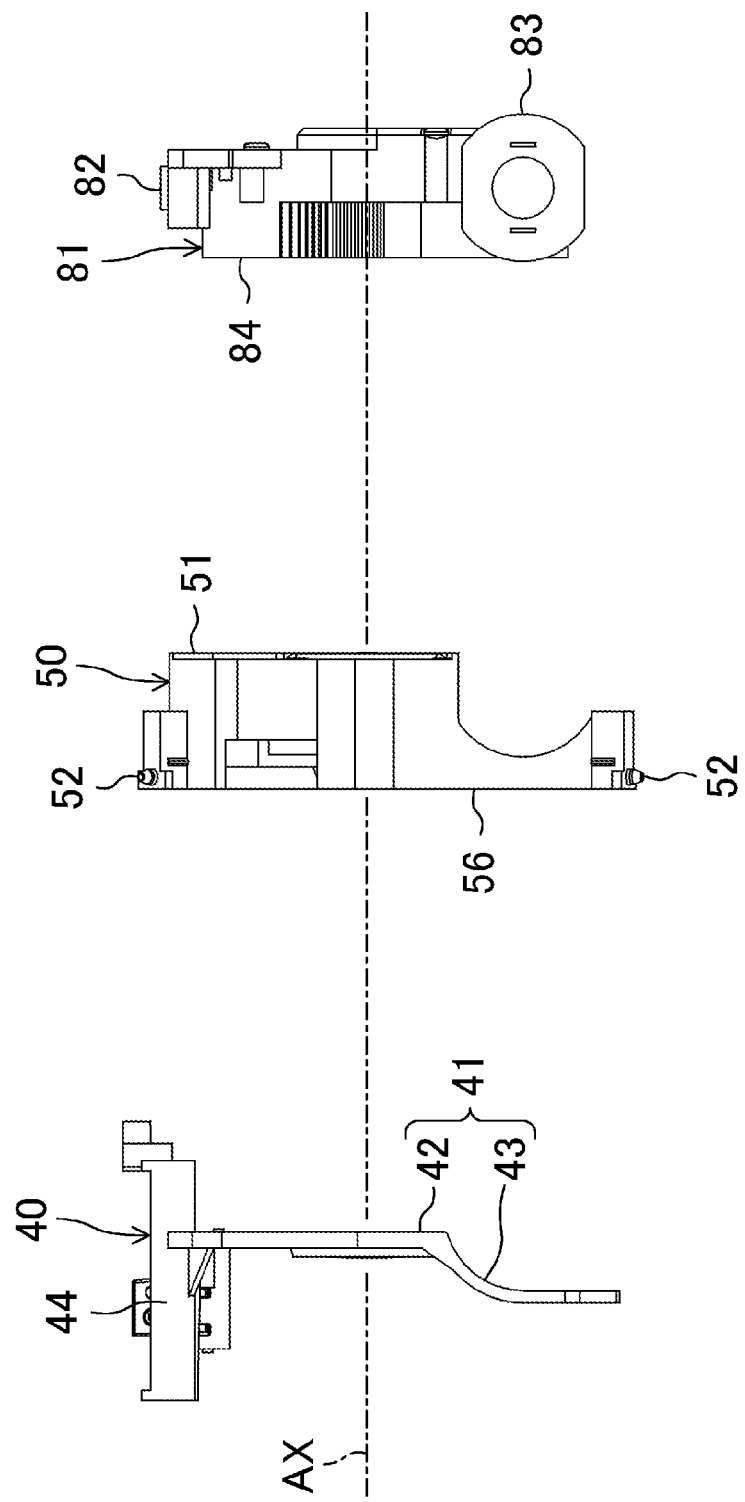
FIG. 17 is a side view of the fourth group unit, the fifth group unit, and the zoom monitor unit spaced from each other.

FIG. 16 is a perspective view illustrating the fourth group unit 40, the fifth group unit 50, and the zoom motor unit 81 spaced from each other. FIG. 17 shows a side view of the fourth group unit 40, the fifth group unit 50, and the zoom motor unit 81 spaced from each other.

The zoom motor unit 81 is substantially L-shaped. The zoom motor unit 81 includes a housing 84 for containing the drive gear 82. Part of the drive gear 82 is exposed from the housing 84. A zoom motor 83 is attached to part of the housing 84 opposite the driver gear 82.

The lens frame 51 of the fifth group unit 50 includes the fifth cam followers 52, a first flat part 53, a second flat part 54, a curved part 55, and a circumferential wall 56 surrounding these parts. The first flat part 53 is orthogonal to the optical axis AX, and holds the fifth lens group L5. The second flat part 54 is orthogonal to the optical axis AX, and is arranged forward of the first flat part 53. The second flat part 54 is arranged forward so that the fifth group unit 50 does not interfere with the housing 84 when the fifth group unit 50 most closely approaches the zoom motor unit 81. The curved part 55 is connected to a lower part of the first flat part 53, and bulges forward with curvature. The curved part 55 is curved along the contour of the zoom motor 83 so that the fifth group unit 50 does not interfere with the zoom motor 83 when the fifth group unit 50 most closely approaches the zoom motor unit 81. Part of the circumferential wall 56 is cut along the contour of the zoom motor 83 to avoid the interference with the zoom motor 83. A first opening 57 surrounded by the circumferential wall 56 and the curved part 55 is formed on one side of the curved part 55. A second opening 58 surrounded by the first flat part 53, the second flat part 54, and the curved part 55 is formed on the other side of the curved part 55. The fifth cam followers 52 are provided on an outer circumferential surface of the circumferential wall 56.

The lens frame 41 of the fourth group unit 40 includes a flat part 42, a curved part 43, a bearing 44, and a rack 45. The flat part 42 is orthogonal to the optical axis AX, and holds the fourth lens group L4. The curved part 43 is connected to a lower part of the flat part 42, and bulges forward with curvature. The curved part 43 is provided with an opening 46. The opening 46 is shaped so that the curved part 55 of the lens frame 51 fits in the opening 46. That is, the curved part 55 is shaped to substantially close the opening 46. The curved part 43 is shaped to fit in the first opening 57 and the second opening 58 of the lens frame 51. That is, the curved part 43 is shaped to substantially close the first opening 57 and the second opening 58. The curved part 43 is curved along the contour of the zoom motor 83 to avoid interference with the zoom motor 83 when the fourth group unit 40 most closely approaches the zoom motor unit 81. The bearing 44 is provided on an upper part of the flat part 42. One of the shafts of the inner frame 70 is inserted in the bearing 44. A notch 47 engaging with another shaft of the inner frame 70 is formed in part of the curved part 43 opposite the flat part 42. The rack 45 is provided near the bearing 44.

Figure 18:
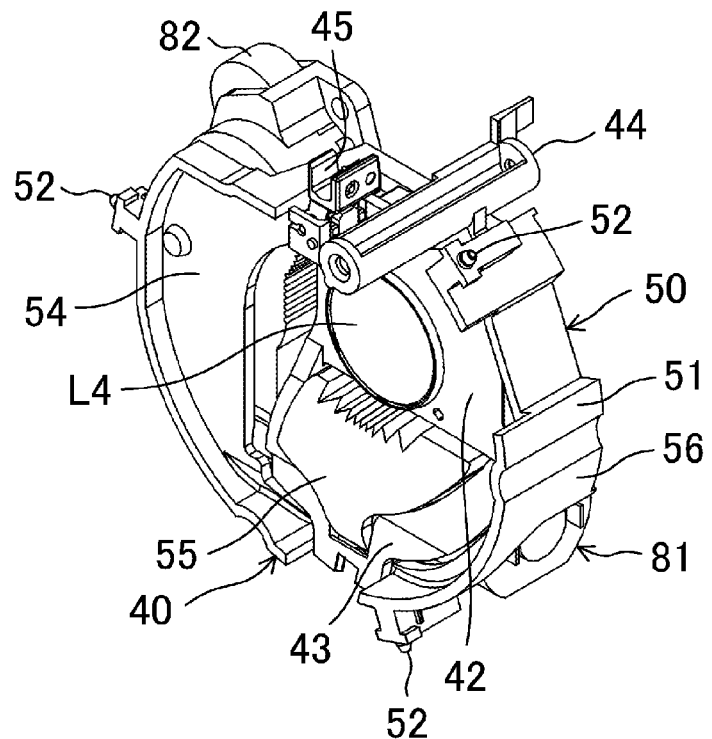
FIG. 18 is a perspective view of the fourth group unit, the fifth group unit, and the zoom monitor unit in a retracted state.
Figure 19:
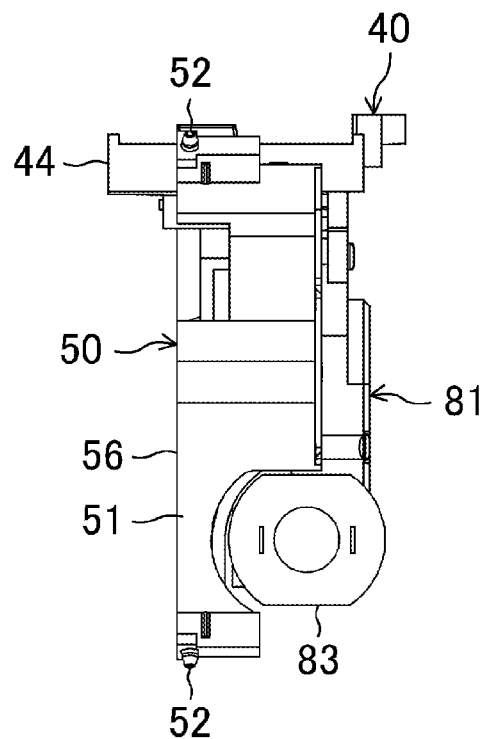
FIG. 19 is a side view of the fourth group unit, the fifth group unit, and the zoom monitor unit in the retracted state.
Figure 20:
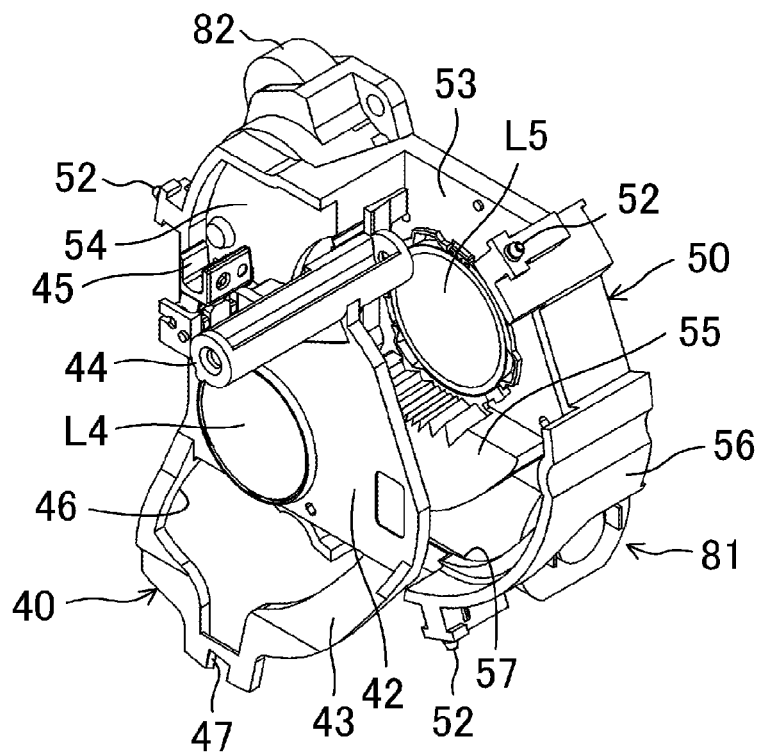
FIG. 20 is a perspective view of the fourth group unit, the fifth group unit, and the zoom monitor unit in a telephoto state.
Figure 21:
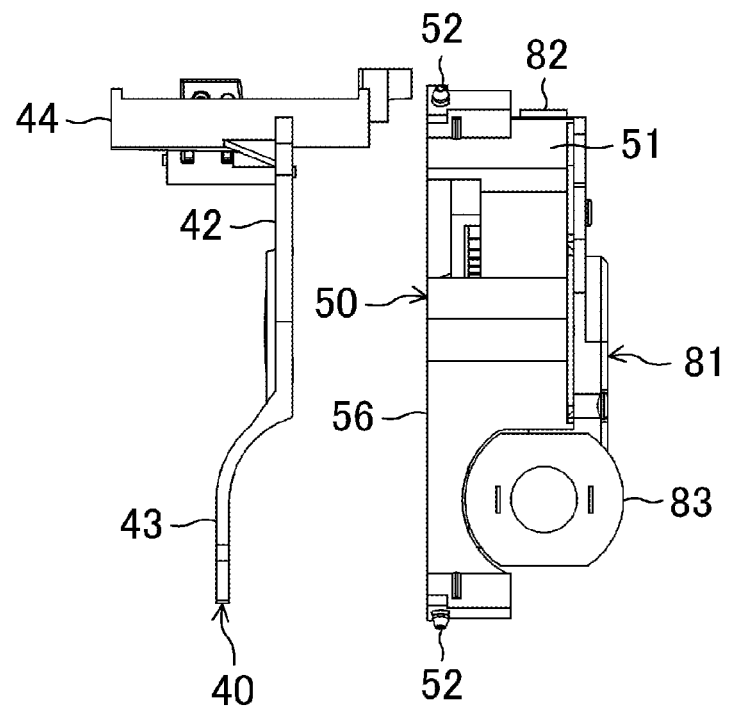
FIG. 21 is a side view of the fourth group unit, the fifth group unit, and the zoom monitor unit in the telephoto state.

FIG. 18 shows a perspective view of the fourth group unit 40, the fifth group unit 50, and the zoom motor unit 81 in a retracted state. FIG. 19 shows a side view of the fourth group unit 40, the fifth group unit 50, and the zoom motor unit 81 in the retracted state. FIG. 20 shows a perspective view of the fourth group unit 40, the fifth group unit 50, and the zoom motor unit 81 in a telephoto state. FIG. 21 shows a side view of the fourth group unit 40, the fifth group unit 50, and the zoom motor unit 81 in the telephoto state.

The fourth group unit 40 most closely approaches the zoom motor unit 81 in the refracted state. In this state, the curved part 43 of the fourth group unit 40 fits in the first and second openings 57 and 58 of the fifth group unit 50, and the curved part 55 of the fifth group unit 50 fits in the opening 46 of the fourth group unit 40. Thus, the fourth group unit 40 and the fifth group unit 50 can approach each other, thereby making the lens barrel 100 compact.

In addition, the curved part 55 is shaped to substantially close the opening 46, and the curved part 43 is shaped to substantially close the first and second openings 57 and 58. Thus, a gap between the lens frame 41 and the lens frame 51 is reduced as much as possible, and the zoom motor 83 can be covered with the curved part 43 and the curved part 55. This can reduce reflection of unwanted light on the zoom motor 83, and can reduce flare and ghost.

[3-4. Image Blur Correction Apparatus]

Figure 22:
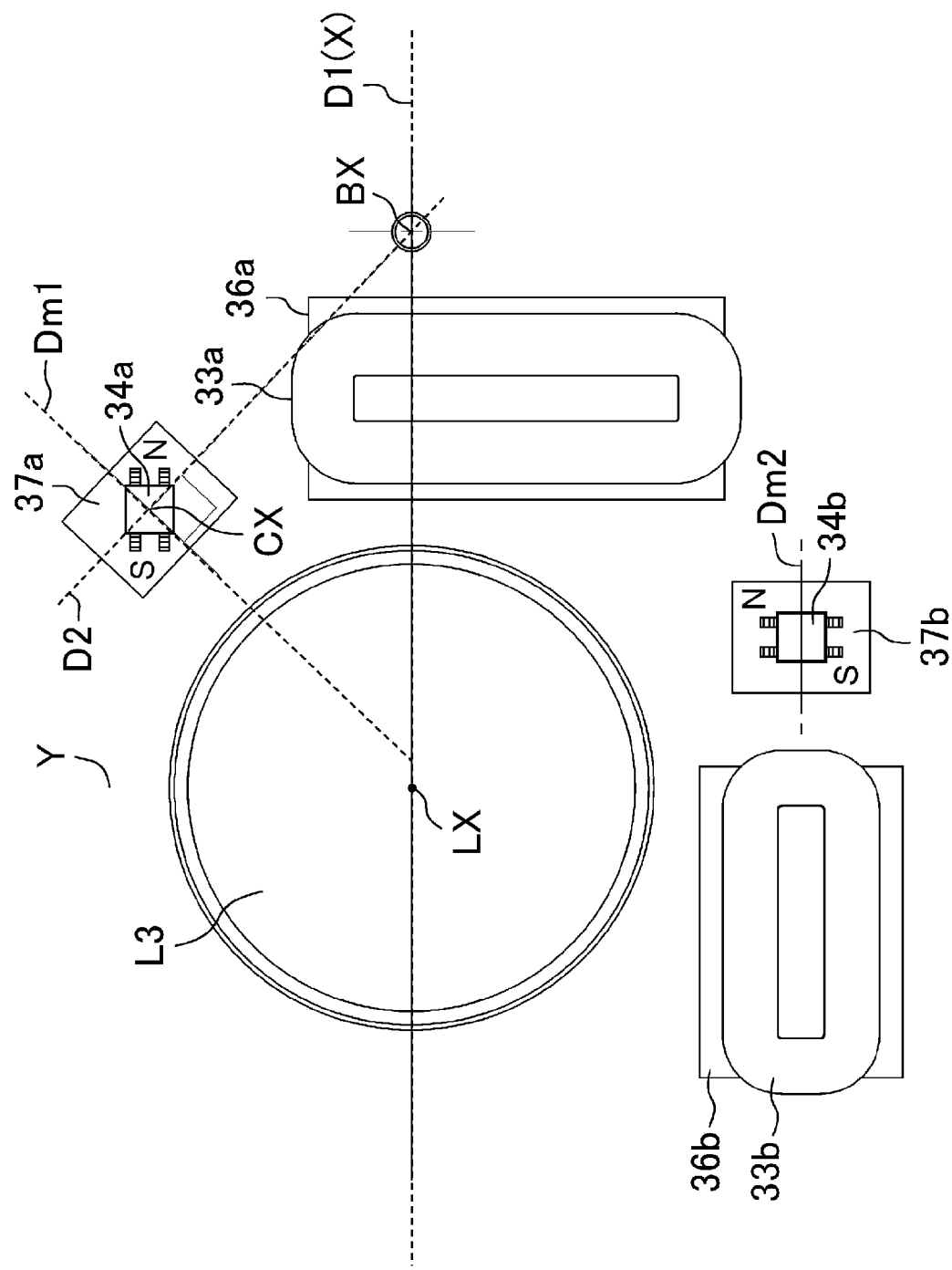
FIG. 22 shows a layout of an image blur correction device viewed from a rear side in an optical axis direction.

An image blur correction device will be described with reference to FIGS. 4 and 22. FIG. 22 shows a layout of the image blur correction device as viewed from behind in the optical axis direction.

As shown in FIG. 4, the image blur correction device includes an X drive coil 33*a*, a Y drive coil 33*b*, a first sensor 34*a*, a second sensor 34*b*, an X drive magnet 36*a*, a Y drive magnet 36*b*, an X sensor magnet 37*a*, a Y sensor magnet 37*b*, an X yoke 38*a*, and a Y yoke 38*b*.

The X drive coil 33*a*, the Y drive coil 33*b*, the first sensor 34*a*, and the second sensor 34*b* are fixed to the third frame 31. The X drive magnet 36*a*, the Y drive magnet 36*b*, the X sensor magnet 37*a*, the Y sensor magnet 37*b*, the X yoke 38*a*, and the Y yoke 38*b* are fixed to the OIS lens frame 35. The third frame 31 is provided with a rotating shaft BX extending in the optical axis direction (see FIG. 22). The OIS lens frame 35 is supported by the third frame 31 to be movable in a plane orthogonal to the optical axis AX, and rotatable about the rotating shaft BX.

The X drive magnet 36*a*, the Y drive magnet 36*b*, the X sensor magnet 37*a*, and the Y sensor magnet 37*b* are at least bipolar magnetized. The X yoke 38*a* is made of a ferromagnetic material, and functions as a back yoke of the X drive magnet 36*a* and the X sensor magnet 37*a*. The X yoke 38*a*, the X drive magnet 36*a*, and the X sensor magnet 37*a* are integrally bonded to the OIS lens frame 35. The Y yoke 38*b* is also made of a ferromagnetic material, and functions as a back yoke of the Y drive magnet 36*b* and the Y sensor magnet 37*b*. The Y yoke 38*b*, the Y drive magnet 36*b*, and the Y sensor magnet 37*b* are integrally bonded to the OIS lens frame 35.

As shown in FIG. 22, the X drive magnet 36*a* faces the X drive coil 33*a*. The X drive magnet 36*a* and the X drive coil 33*a* form an X-axis drive actuator for moving the OIS lens frame 35 in the X-axis direction. A center LX of the third lens group L3 and the rotating shaft BX are substantially aligned in the X-axis direction. When the X drive coil 33*a* is energized, thrust which moves the OIS lens frame 35 in the X-axis direction (a direction of a first straight line D1) is generated by an interaction between the X drive coil 33*a* and the X drive magnet 36*a*. The X sensor magnet 37*a* faces the first sensor 34*a*. The first sensor 34*a* detects the movement of the OIS lens frame 35 in the X-axis direction based on a change in magnetic flux density.

The Y drive magnet 36*b* faces the Y drive coil 33*b*. The Y drive magnet 36*b* and the Y drive coil 33*b* form a Y-axis drive actuator for moving the OIS lens frame 35 in the Y-axis direction. When the Y drive coil 33*b* is energized, thrust which moves the OIS lens frame 35 in the Y-axis direction is generated by an interaction between the Y drive coil 33*b* and the Y drive magnet 36*b*. The Y sensor magnet 37*b* faces the second sensor 34*b*. The second sensor 34*b* detects the movement of the OIS lens frame 35 in the Y-axis direction based on a change in magnetic flux density.

The layout of the X drive coil 33*a*, etc. will be described in more detail. The X sensor magnet 37*a* is arranged so that a magnetic pole separation line Dm1 (a boundary line between N and S poles) thereof is inclined relative to the X-axis direction and the Y-axis direction. More specifically, the X sensor magnet 37*a* is arranged so that the magnetic pole separation line Dm1 is orthogonal to a second straight line D2 connecting a center CX (a detection center) of the first sensor 34*a* and the rotating shaft BX. A triangle is formed by the second straight line D2 connecting the center CX of the first sensor 34*a* and the rotating shaft BX, the magnetic pole separation line Dm1 of the X sensor magnet 37*a*, and the first straight line D1 connecting the rotating shaft BX and the center of the third lens group L3. A magnetic pole separation line Dm2 of the Y sensor magnet 37*b* is substantially parallel to the first straight line D1.

Figure 23:
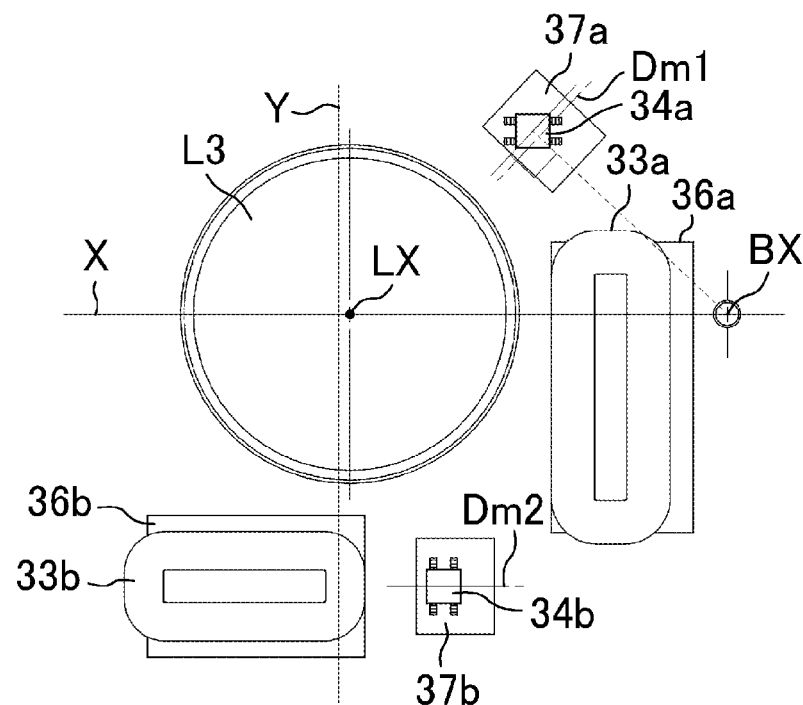
FIG. 23 shows a layout of an X drive coil, etc. when a third lens group has moved to a positive side in an X-axis direction.
Figure 24:
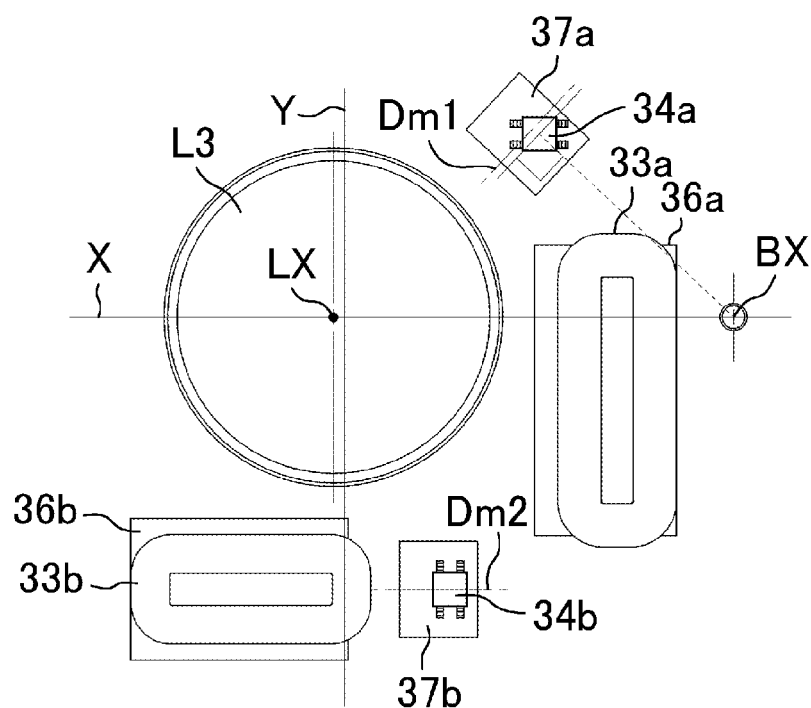
FIG. 24 shows a layout of the X drive coil, etc. when the third lens group has moved to a negative side in the X-axis direction.
Figure 25:
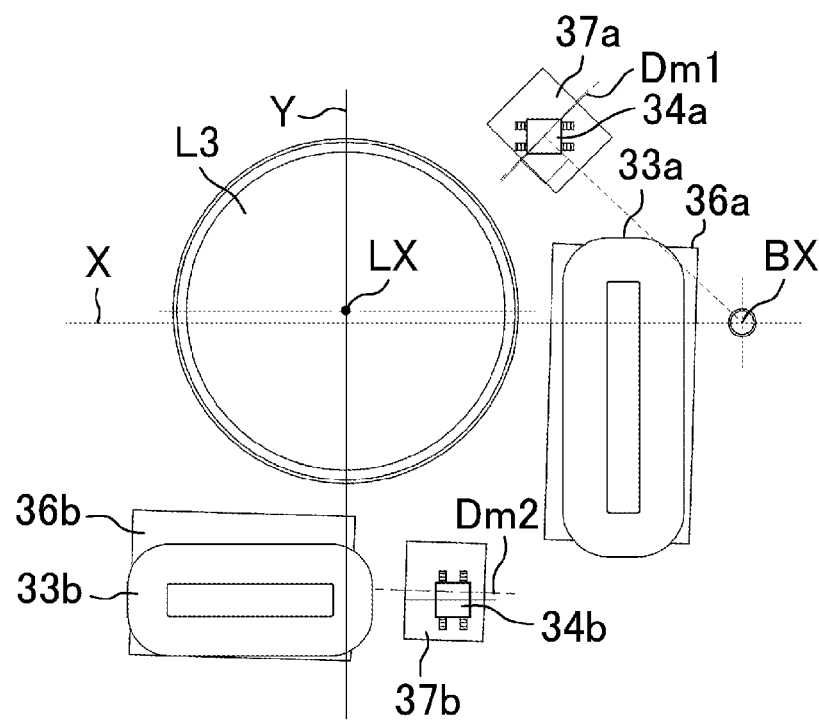
FIG. 25 shows a layout of the X drive coil, etc. when the third lens group has moved to a positive side in a Y-axis direction.
Figure 26:
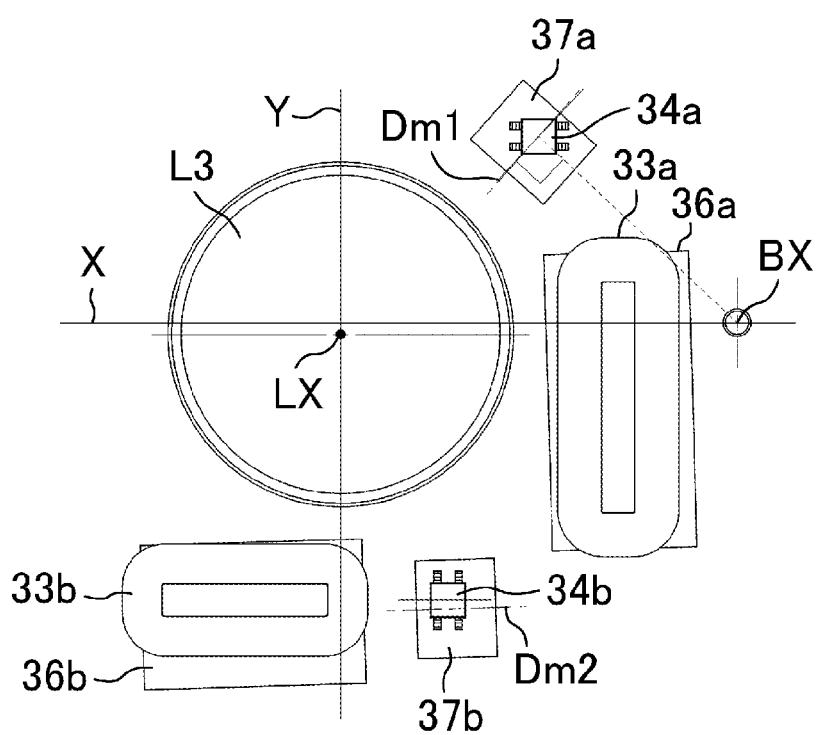
FIG. 26 shows a layout of the X drive coil, etc. when the third lens group has moved to a negative side in the Y-axis direction.

FIG. 23 shows a layout of the X drive coil 33*a*, etc. when the third lens group L3 has moved to the positive side in the X-axis direction. FIG. 24 shows a layout of the X drive coil 33*a*, etc. when the third lens group L3 has moved to the negative side in the X-axis direction. FIG. 25 shows a layout of the X drive coil 33*a*, etc. when the third lens group L3 has moved to the positive side in the Y-axis direction. FIG. 26 shows a layout of the X drive coil 33*a*, etc. when the third lens group L3 has moved to the negative side in the Y-axis direction.

As shown in FIGS. 23 and 24, when the third lens group L3 moves in the X-axis direction, the position of the magnetic pole separation line Dm1 of the X sensor magnet 37*a* changes relative to the first sensor 34*a*, while the position of the magnetic pole separation line Dm2 of the Y sensor magnet 37*b* hardly changes relative to the second sensor 34*b*. Thus, the movement of the third lens group L3 in the X-axis direction can be detected based on an output of the first sensor 34*a*.

As shown in FIGS. 25 and 26, when the third lens group L3 moves in the Y-axis direction, the position of the magnetic pole separation line Dm1 of the X sensor magnet 37*a* hardly changes relative to the first sensor 34*a*, while the magnetic pole separation line Dm2 of the Y sensor magnet 37*b* changes relative to the second sensor 34*b*. Thus, the movement of the third lens group L3 in the Y-axis direction can be detected based on an output of the second sensor 34*b*.

Specifically, the movement of the third lens group L3 in the X-axis direction and the movement of the third lens group L3 in the Y-axis direction can independently be detected by the first sensor 34*a* and the second sensor 34*b*, respectively.

Figure 27:
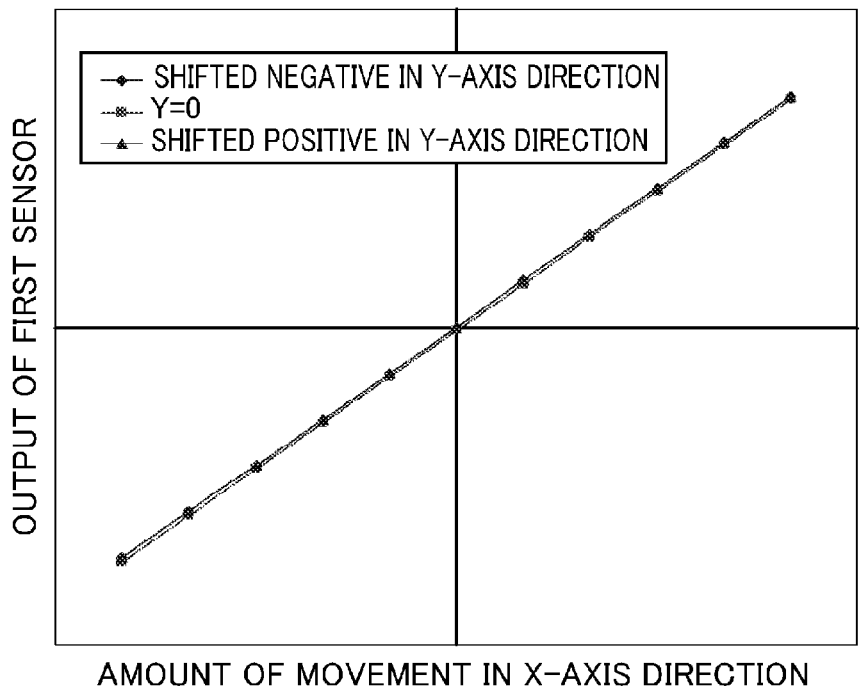
FIG. 27 is a graph showing a relationship between an amount of movement of the third lens group in the X-axis direction and an output of a first sensor.

FIG. 27 is a graph showing a relationship between an amount of movement of the third lens group L3 in the X-axis direction and the output of the first sensor 34*a*. The position of the third lens group L3 in the Y-axis direction is fixed, and only the position of the third lens group L3 in the X-axis direction is varied. The third lens group L3 is fixed at a reference position in the Y-axis direction (y=0), a position shifted from the reference position to the positive side in the Y-axis direction by a predetermined distance, and a position shifted from the reference position to the negative side in the Y-axis direction by a predetermined distance. As shown in FIG. 27, the amount of movement of the third lens group L3 in the X-axis direction is substantially proportional to the output of the first sensor 34*a*. The output of the first sensor 34*a* relative to the position of the third lens group L3 in the X-axis direction hardly changes depending on the position of the third lens group L3 in the Y-axis direction.

Figure 28:
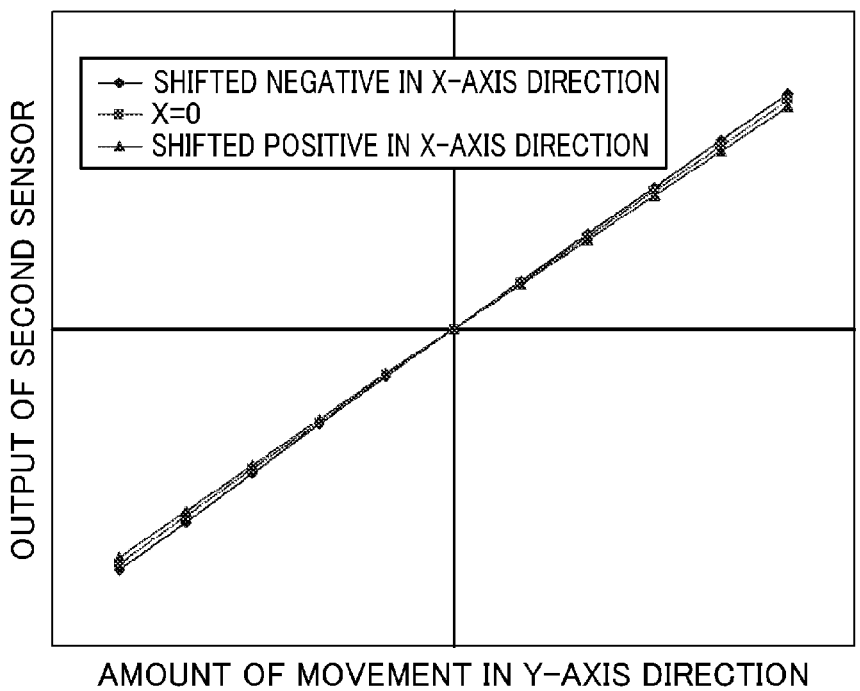
FIG. 28 is a graph showing a relationship between an amount of movement of the third lens group in the Y-axis direction and an output of a second sensor.

FIG. 28 is a graph showing a relationship between an amount of movement of the third lens group L3 in the Y-axis direction and the output of the second sensor 34*b*. The position of the third lens group L3 in the X-axis direction is fixed, and only the position of the third lens group L3 in the Y-axis direction is varied. The third lens group L3 is fixed at a reference position in the X-axis direction (x=0), a position shifted from the reference position to the positive side in the X-axis direction by a predetermined distance, and a position shifted from the reference position to the negative side in the X-axis direction by a predetermined distance. As shown in FIG. 28, the amount of movement of the third lens group L3 in the Y-axis direction is substantially proportional to the output of the second sensor 34*b*. The output of the second sensor 34*b* relative to the position of the third lens group L3 in the Y-axis direction hardly changes depending on the position of the third lens group L3 in the X-axis direction.

In this way, the amounts of movement of the third lens group L3 in the X-axis direction and the Y-axis direction can independently be detected by the first sensor 34*a* and the second sensor 34*b*, respectively. Thus, there is no need to perform a special calculation to obtain the position of the third lens group L3. The position of the third lens group L3 can easily be detected, and the third lens group L3 can easily be driven. Moreover, a control circuit can be simplified and downsized, thereby reducing the size and the cost of the lens barrel 100.

A method for detecting the amounts of movement of the third lens group L3 in the X-axis direction and the Y-axis direction with independent sensors has been disclosed in International Patent Publication No. WO2008/155906 filed by the applicant of the present application. In this method, at least one of the sensors needs to be located on a straight line connecting a rotating shaft and a lens for image blur correction. However, in the structure described above, the sensor is not required on the straight line connecting the rotating shaft BX and the center LX of the third lens group L3. Specifically, in the structure of the present embodiment, the X drive coil 33*a* can be upsized because the position of the sensor is not restricted, and thrust of an actuator can be increased even when the whole dimension of the image blur correction device is unchanged. When the thrust of the actuator is sufficiently large, the whole dimension of the image blur correction device can be downsized, and the lens barrel 100 can be downsized.

Thus, the structure of the present embodiment can downsize the lens barrel 100, and can downsize a camera including the lens barrel 100.

[3-5. Imaging Device Unit 90]

Figure 29:
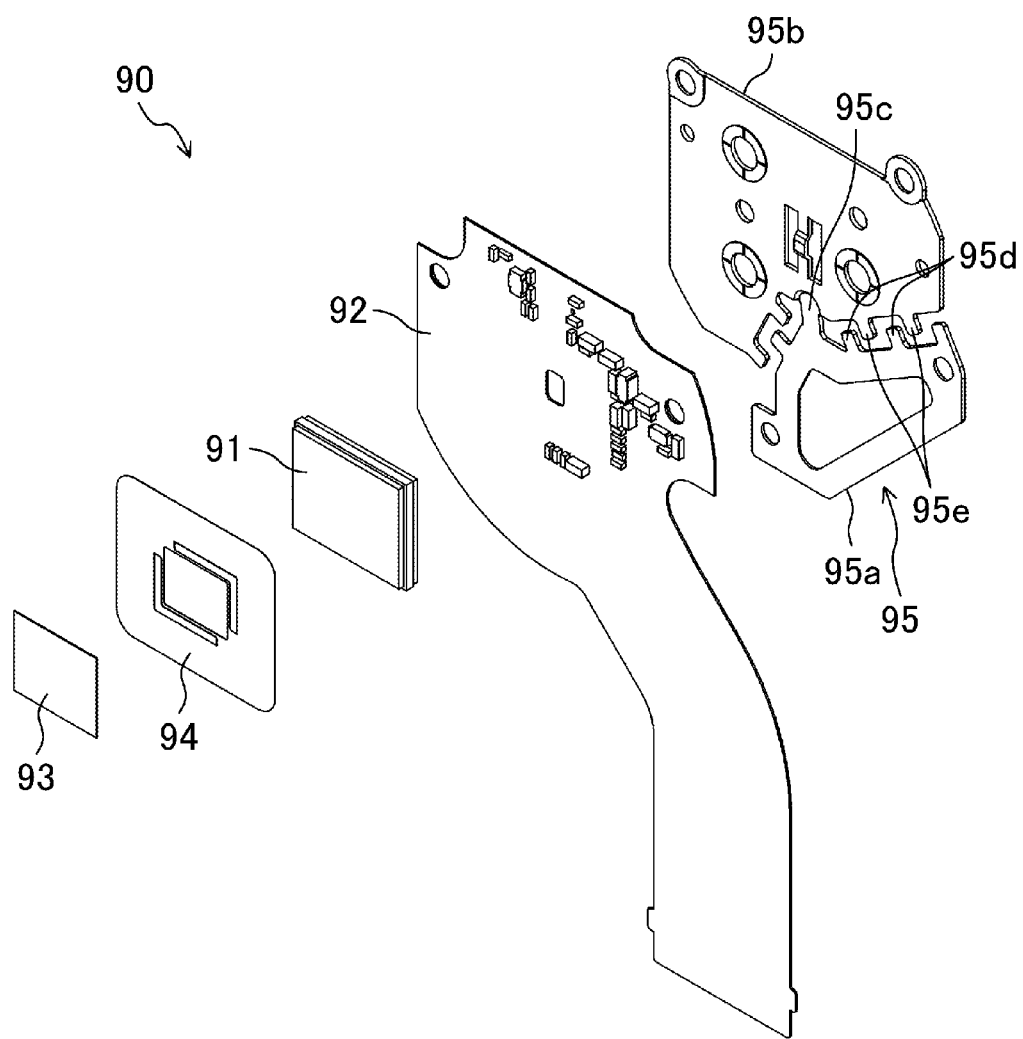
FIG. 29 is an exploded perspective view of an imaging device unit.
Figure 30:
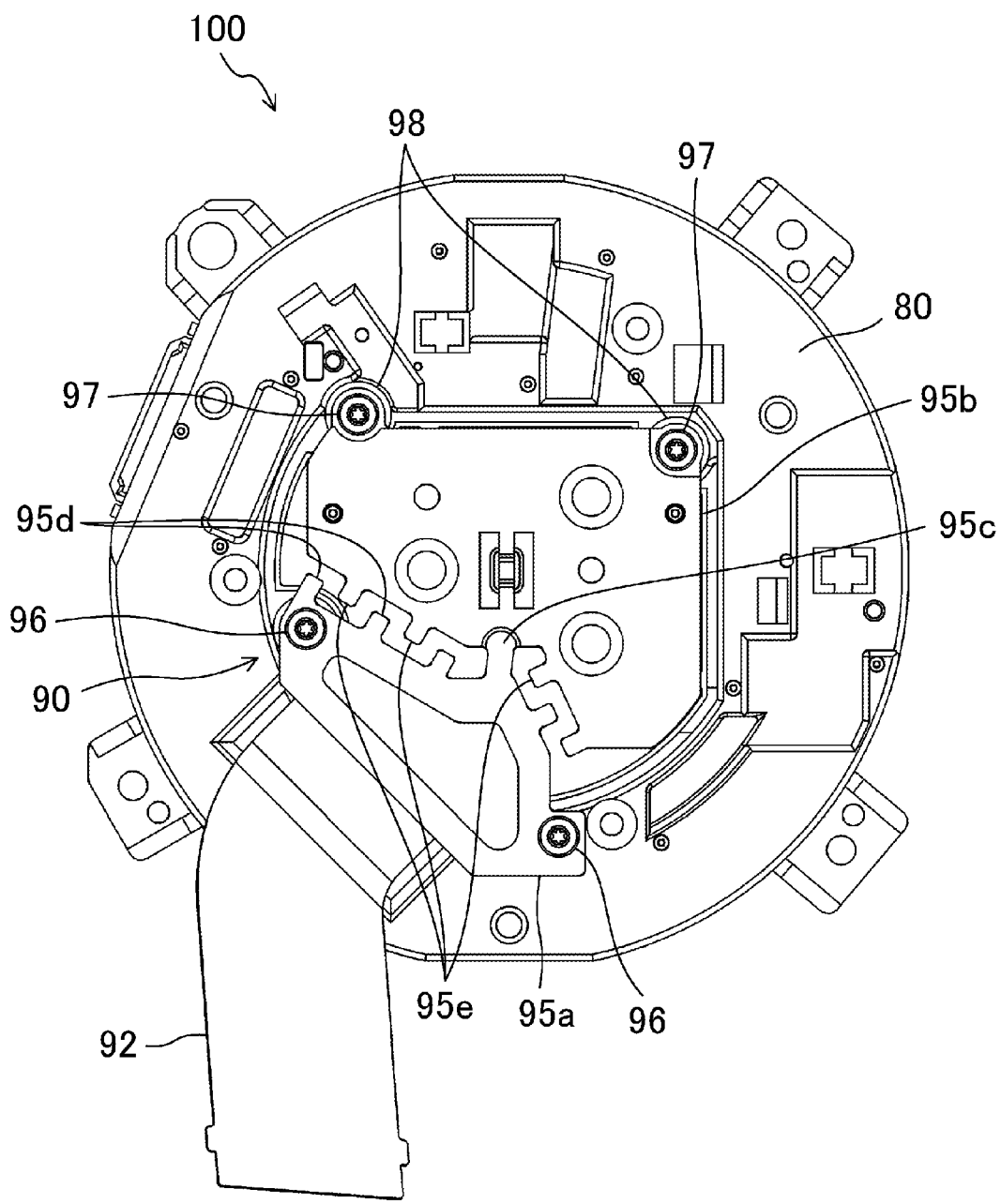
FIG. 30 is a back view of the lens barrel.

The imaging device unit 90 will be described below with reference to FIGS. 29 and 30. FIG. 29 shows an exploded perspective view of the imaging device unit 90. FIG. 30 shows a back view of the lens barrel 100.

As shown in FIG. 29, the imaging device unit 90 includes an imaging device 91, a flexible printed circuit board 92, a filter 93, a light blocking sheet 94, and a sheet metal 95.

The imaging device 91 is mounted on the flexible printed circuit board 92. The filter 93 is fixed to a side of the imaging device 91 facing the object through the light blocking sheet 94. The filter 93 blocks light of a wavelength unnecessary for the imaging device 91.

The light blocking sheet 94 is in the shape of a substantially square frame, and has an opening in the center thereof. The opening of the light blocking sheet 94 exposes the imaging device 91. The light blocking sheet 94 blocks unwanted light from entering an outer peripheral portion of the imaging device 91. In attaching the imaging device 91 to the master flange 80, the outer peripheral portion of the light blocking sheet 94 is pressed to cover the opening of the master flange 80. Thus, the light blocking sheet 94 blocks a gap between the opening of the master flange 80 and the imaging device 91 to prevent entrance of foreign matters such as dust and dirt to the inside of the lens barrel 100.

The sheet metal 95 is a member used to attach the imaging device 91 to the master flange 80. The sheet metal 95 is bonded to a back side of the imaging device 91 and the flexible printed circuit board 92. The sheet metal 95 includes a fixing part 95a to be fixed to the master flange 80, an adjustment part 95b holding the imaging device 91 and adjusting a tilt of the imaging device 91, and a bridge part (a connecting part) 95c for connecting the fixing part 95a and the adjustment part 95b.

The imaging device 91 and the flexible printed circuit board 92 are attached to the adjustment part 95b of the sheet metal 95. A gap is provided between the fixing part 95a and the flexible printed circuit board 92.

As shown in FIG. 30, the sheet metal 95 is fixed to the master flange 80 with four screws including two fixing screws 96 and two adjustment screws 97. The fixing screws 96 are fastened until the fixing part 95a of the sheet metal 95 and the master flange 80 are completely brought into close contact. A tilt adjustment spring 98 is placed around each of the adjustment screws 97. The tilt adjustment spring 98 is located between the adjustment part 95b and the master flange 80. When the adjustment screw 97 once fastened is loosened, a gap is provided between the adjustment part 95b and the master flange 80. The tilt of the imaging device 91 relative to the optical axis is adjusted by adjusting the degree of fastening of the adjustment screws 97. For example, the tilt of the imaging device 91 is adjusted so that the highest resolution performance is obtained.

The fixing part 95a and the adjustment part 95b are connected through the bridge part 95c which is deformed more easily than the fixing part 95a and the adjustment part 95b. In adjusting the tilt of the imaging device 91, the bridge part 95c is greatly deformed as compared with the fixing part 95a and the adjustment part 95b. Thus, the adjustment part 95b can easily be displaced with the fixing part 95a fixed to the master flange 80.

The bridge part 95c is arranged near the center of an imaging surface of the imaging device 91. For example, when viewed from the optical axis direction, the bridge part 95c is located to overlap with the imaging device 91. This can reduce displacement of the imaging device 91 in the optical axis direction in adjusting the tilt of the imaging device 91.

Specifically, in adjusting the tilt, the sheet metal 95 is deformed about the bridge part 95c. Thus, the degree of displacement of the imaging device 91 in the optical axis direction increases with increasing distance from the bridge part 95c. For example, according to International Patent Publication No. WO2010/007745 filed by the applicant of the present application, a sheet metal is fixed at one part, and the tilt is adjusted with screws provided at two parts of the sheet metal. In this case, part of the sheet metal to be deformed is located closer to the fixed part, which is away from the center of the imaging surface of the imaging device 91. In contrast, when the bridge part 95c is located near the center of the imaging surface of the imaging device 91, the displacement of the center of the imaging device 91 in the optical axis direction can be reduced in adjusting the tilt.

The flexible printed circuit board 92 has a narrow part extending between the two fixing screws 96. With the narrow part of the flexible printed circuit board 92 extending between the fixing screws 96, influence of an external force on the imaging device 91 can be reduced, even if the external force is applied to the flexible printed circuit board 92. Specifically, after the tilt of the imaging device 91 has been adjusted, change of the tilt of the imaging device 91 due to the external force applied to the flexible printed circuit board 92 can be reduced.

The fixing part 95a includes a plurality of first protrusions 95d protruding toward the adjustment part 95b. The adjustment part 95b includes a plurality of second protrusions 95e protruding toward the fixing part 95a. The first protrusions 95d and the second protrusions 95e are alternately arranged in a gap between the fixing part 95a and the adjustment part 95b. One first protrusion 95d is located between two adjacent second protrusions 95e. One second protrusion 95e is located between two adjacent first protrusions 95d. With the provision of the first protrusions 95d and the second protrusions 95e, entanglement of a plurality of sheet metals 95 can be reduced when the sheet metals 25 are transported together. Therefore, deformation of the sheet metals 25 can be reduced, and difficulty in separating the sheet metals 95 can be reduced.

[4. Advantages]

As described above, the lens barrel 100 includes the cam frame 60, the zoom motor unit 81 for driving the cam frame 60 to rotate about the optical axis AX, and the fifth group unit 50 including the fifth cam followers 52, and engaging with the cam frame 60 through the fifth cam followers 52 to move in the optical axis direction as the cam frame 60 rotates. The cam frame 60 is provided with the internal gear 66 engaging with the zoom motor unit 81, and the fifth cam grooves 65 engaging with the fifth cam followers 52. The internal gear 66 includes a plurality of teeth 66a aligned in the circumferential direction about the optical axis AX, and each of the fifth cam grooves 65 is continuous with the tooth space 66b formed between two adjacent teeth 66a. Each of the fifth cam followers 52 is smaller than the tooth space 66b to pass through the tooth space 66b.

In this structure, the fifth cam follower 52 can cross the internal gear 66 to enter the guiding part 65b of the fifth cam groove 65. Thus, there is no need to shift the position of the fifth cam groove 65 in the circumferential direction relative to the internal gear 66. This can improve design flexibility of the fifth cam grooves 65, and can downsize the lens barrel 100.

The internal gear 66 is provided at the rear end part of the cam frame 60 in the optical axis direction, and at least part of the fifth cam groove 65 is formed at a side of the internal gear 66 opposite to the rear end part in the optical axis direction. Part of the fifth cam groove 65 may be formed closer to the rear edge than the internal gear 66 in the optical axis direction.

In this structure, even when the internal gear 66 is provided at the rear edge of the cam frame 60, the fifth cam follower 52 can be introduced to the fifth cam groove 65 from the rear edge. Specifically, the direction along which the fifth cam follower 52 moves, and the shape of the fifth cam groove 65 are not restricted by the internal gear 66. This can improve the design flexibility and the ease of assembly of the lens barrel 100.

The fifth cam follower 52 is tapered, and the tooth space 66b has a width decreasing with decreasing distance from the bottom of the tooth space. The fifth cam follower 52 and the tooth space 66b have substantially the same taper angle.

In this structure, even when the fifth cam follower 52 is smaller than the tooth space 66b, a vertical cross-sectional area of the fifth cam follower 52 can be kept large, and the break of the fifth cam follower 52 can be prevented.

The fifth cam groove 65 has a smaller width than the tooth space 66b.

In this structure, the fifth cam follower 52 is smaller than the tooth space 66b, and likewise, the fifth cam groove 65 is also smaller than the tooth space 66b. Thus, even if the fifth cam follower 52 is smaller than the tooth space 66b of the internal gear 66, the fifth cam follower 52 and the fifth cam groove 65 can suitably engage with each other, and backlash can be reduced when the fifth cam follower 52 is guided along the fifth cam groove 65.

The base end of the fifth cam follower 52 has the smallest transverse cross-sectional area among the base ends of the cam followers of the optical units included in the lens barrel 100 and driven by the cam mechanism.

In this structure, the fifth cam follower 52 is small so that the fifth cam follower 52 can easily pass through the tooth space 66b. Further, the fifth cam follower 52 is small so that excessive widening of the tooth space 66b can be prevented.

The fifth group unit 50 is the lightest optical unit among the optical units included in the lens barrel 100 and driven by the cam mechanism.

In this structure, the fifth group unit 50 is light so that the possibility of break of the fifth cam follower 52 can be reduced even if the fifth cam follower 52 is narrowed. Thus, the fifth cam follower 52 can easily be configured to pass through the tooth space 66b.

The lens barrel 100 further includes the fourth group unit 40 located inside the cam frame 60, the inner frame 70 which supports the fourth group unit 40 to be movable in the optical axis direction and is contained inside the cam frame 60, and the focus motor unit 49 provided in the inner frame 70 to drive the fourth group unit 40. At least part of the fifth cam groove 65 is formed closer to the fourth group unit 40 than the internal gear 66 in the optical axis direction. Note that part of the fifth cam groove 65 may be formed closer to the rear edge than the internal gear 66 in the optical axis direction.

In this structure, with the cam frame 60 containing the inner frame 70 supporting the fourth group unit 40, the fifth group unit 50 cannot be inserted in the cam frame 60 through the fourth group unit 40, and should be inserted in the cam frame 60 through the internal gear 66. Since the fifth cam follower 52 can pass through the tooth space 66b of the internal gear 66, the fifth group unit 50 can be inserted in the cam frame 60 through the internal gear 66.

The lens barrel 100 includes the third group unit 30 having the third cam followers 32 formed on an outer circumferential surface thereof, the inner frame 70 which is provided with the second translational grooves 72 radially penetrating the inner frame 70 in the radial direction and receiving the third cam followers 32 inserted therein, and the helicoid protrusions 73 formed on the outer circumferential surface thereof, and the cam frame 60 which is provided with the helicoid grooves 64 engaging with the helicoid protrusions 73 and the third cam grooves 63 engaging with the third cam followers 32, both of the grooves formed in the inner circumferential surface of the cam frame 60. The cam frame 60 rotates relative to the inner frame 70 to move the third group unit 30 in the optical axis direction relative to the inner frame 70. The helicoid grooves 64 and the third cam grooves 63 are connected.

In this structure, the third cam followers 32 can enter the third cam grooves 63 through the helicoid grooves 64. This can improve the design flexibility of the cam grooves, and can downsize the lens barrel 100. The engagement of the helicoid protrusions 73 and the helicoid grooves 64 can enlarge a plane receiving impact upon application of an external force to the lens barrel 100 due to the lens barrel 100 being dropped, etc. This can improve resistance of the lens barrel 100 against drop.

The width W4 of the helicoid groove 64 is equal to or larger than the width W3 of the third cam groove 63.

The third cam follower 32 engages with the third cam groove 63. Thus, when the helicoid groove 64 is wider than the third cam groove 63, the third cam follower 32 can smoothly pass through the helicoid groove 64.

The angle A4 formed by the two sidewalls of the helicoid groove 64 facing each other is equal to or smaller than the angle A3 formed by the two sidewalls of the third cam grooves 63 facing each other.

The third cam follower 32 engages with the third cam groove 63. Thus, when the angle A4 formed by the two sidewalls of the helicoid groove 64 is smaller than the angle A3 formed by the two sidewalls of the third cam groove 63, the third cam follower 32 can smoothly pass through the helicoid groove 64. When the angle A4 formed by the two sidewalls of the helicoid groove 64 facing each other is reduced, the helicoid protrusion 73 is not easily detached from the helicoid groove 64. This can improve resistance of the lens barrel 100 against impact exerted on the lens barrel 100 due to the lens barrel 100 being dropped, etc.

A depth D4 of the helicoid groove 64 in the radial direction is equal to or larger than a depth D3 of the third cam groove 63 in the radial direction.

The third cam follower 32 engages with the third cam groove 63. Thus, when the depth D4 of the helicoid groove 64 is larger than the depth D3 of the third cam groove 63, the third cam follower 32 can smoothly pass through the helicoid groove 64.

The lens barrel 100 further includes the second group unit 20 provided with the second cam followers 22 formed on the outer circumferential surface thereof. The second cam grooves 62 engaging with the second cam followers 22 are formed in the inner circumferential surface of the cam frame 60 to intersect with the helicoid grooves 64.

Thus, the length of the cam frame 60 in the optical axis direction can advantageously be used. This can downsize the lens barrel 100 in the optical axis direction.

The depth D2 of the second cam groove 62 in the radial direction is larger than the depth D4 of the helicoid groove 64 in the radial direction, and the second cam follower 22 engages with at least part of the second cam groove 62 deeper than the helicoid groove 64.

In this structure, the second cam follower 22 engaging with the second cam groove 62 does not easily fall in the helicoid groove 64 at the intersection between the second cam groove 62 and the helicoid groove 64. This can reduce backlash caused when the second cam follower 22 is guided along the second cam groove 62.

The second cam groove 62 includes the retraction position P21 where the second cam follower 22 stays in the retracted state, the wide-angle position P22 where the second cam follower 22 stays in the maximum wide-angle state, and the telephoto position P23 where the second cam follower 22 stays in the maximum telephoto state. The retraction position P21 is located between the wide-angle position P22 and the telephoto position P23 in the optical axis direction, or located at substantially the same point as the telephoto position P23 in the optical axis direction.

This can increase the angle of rotation of the cam frame 60. Thus, the zoom motor unit 81 and the lens barrel 100 can entirely be downsized.

The image blur correction device includes the third lens group L3 including at least a single lens for image blur correction, the rotating shaft BX as the center of rotation of the third lens group L3, the X drive coil 33a and the X drive magnet 36a for moving the third lens group L3 along the first straight line D1 connecting the lens center LX of the third lens group L3 and the rotating shaft BX, the sensor 34a for detecting the movement of the third lens group L3 along the first straight line D1, and the X sensor magnet 37a which is at least bipolar magnetized and arranged to face the sensor 34a. A triangle is formed by the second straight line D2 connecting the detection center CX of the sensor 34a and the rotating shaft BX, the magnetic pole separation line Dm1 of the X sensor magnet 37a, and the first straight line D1, and the magnetic pole separation line Dm1 and the second straight line D2 substantially form a right angle.

Thus, the actuators and the magnetic detection devices can be arranged with improved flexibility without deteriorating the performance of image blur correction. The image blur correction device advantageously contributes to the downsizing of the lens barrel.

Second Embodiment

A second embodiment will be described below. The second embodiment shows a fifth group unit 250 and a cam frame 260 configured in a different way from those of the first embodiment. Specifically, the fifth cam followers and the fifth cam grooves of the second embodiment are configured in a different way from those of the first embodiment.

Figure 31:
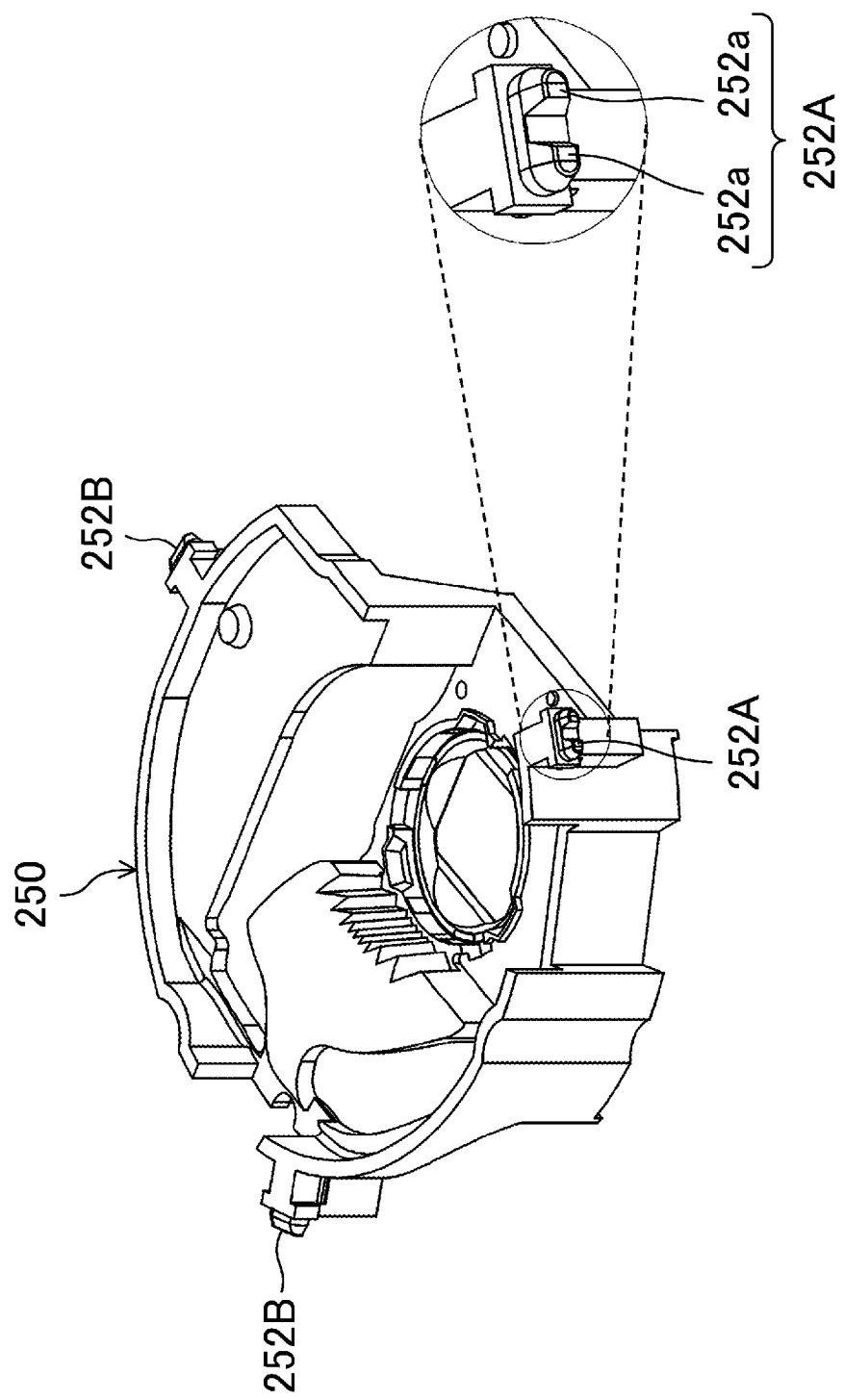
FIG. 31 is a perspective view of a fifth group unit of a second embodiment and an enlarged perspective view of a first fifth cam follower.
Figure 32:
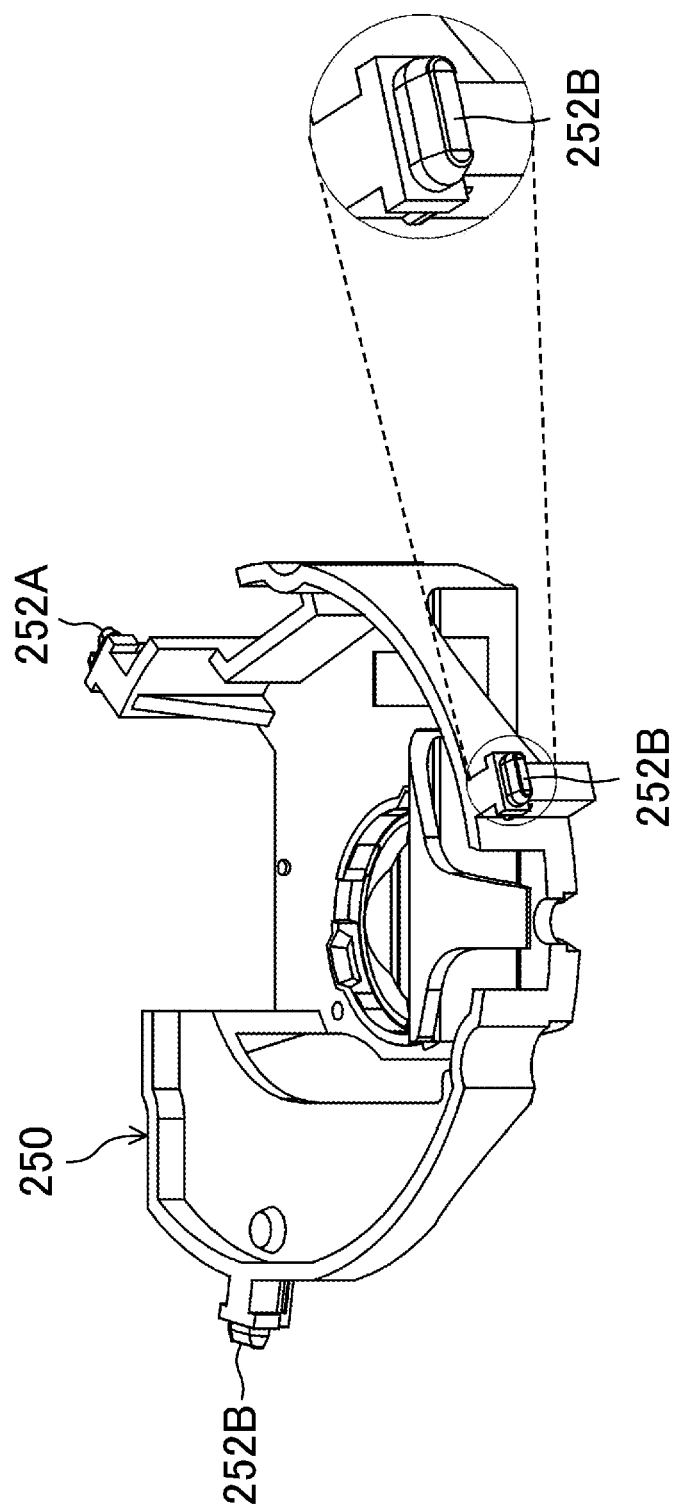
FIG. 32 is a perspective view of the fifth group unit and an enlarged perspective view of a second fifth cam follower.
Figure 33:
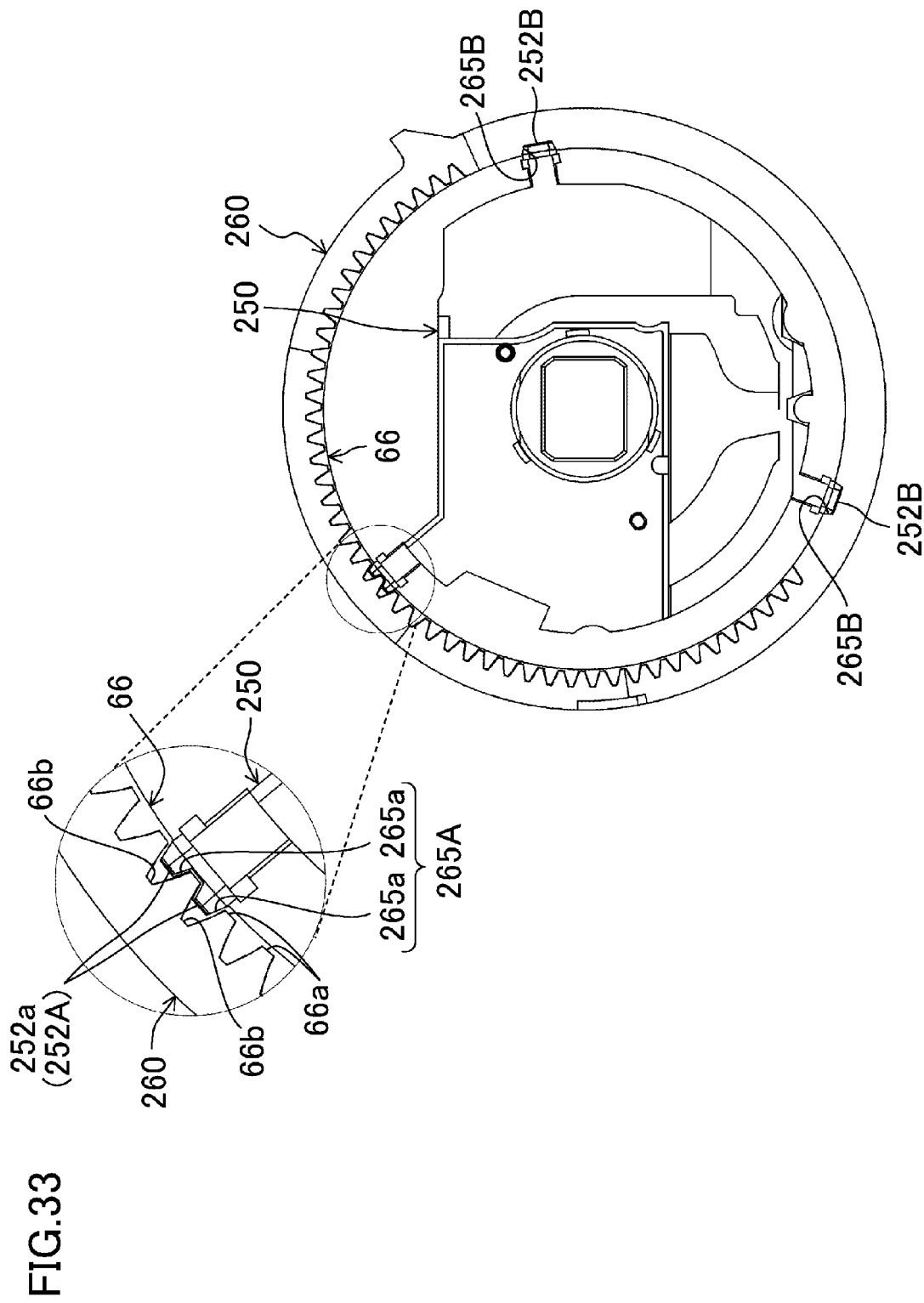
FIG. 33 is a back view and a partially enlarged view of the fifth group unit inserted in the cam frame.

FIG. 31 shows a perspective view of the fifth group unit 250 of the second embodiment, and an enlarged perspective view of a first fifth cam follower 252A. FIG. 32 shows a perspective view of the fifth group unit 250 and an enlarged perspective view of a second fifth cam follower 252B. FIG. 33 shows a back view and a partially enlarged view of the fifth group unit 250 inserted in the cam frame 260.

As shown in FIGS. 31 and 32, the fifth group unit 250 includes a single first fifth cam follower 252A, and two second fifth cam followers 252B. The first fifth cam follower 252A has two protrusions 252a aligned in the circumferential direction. Each of the second fifth cam followers 252B has a single protrusion. A dimension of the second fifth cam follower 252B in the circumferential direction is substantially equal to a dimension of the two protrusions of the first fifth cam follower 252A in the circumferential direction. The fifth group unit 250 is an example of a first optical unit.

Specifically, the first fifth cam follower 252A is formed by providing a notch having a shape corresponding to the shape of the tooth 66a of the internal gear 66 at a circumferential center of the second fifth cam follower 252B. In other words, the shape of the second fifth cam follower 252B corresponds to the shape of the two protrusions 252a of the first fifth cam follower 252A connected with each other.

As shown in FIG. 33, the cam frame 260 is provided with a first fifth cam groove 265A corresponding to the first fifth cam follower 252A, and second fifth cam grooves 265B corresponding to the second fifth cam followers 252B. Each of the second fifth cam grooves 265B is formed by a single line of groove corresponding to the second fifth cam follower 252B. An introducing part 265a of the first fifth cam groove 265A is formed by two lines of grooves corresponding to the two protrusions 252a. The two lines of the introducing part 265a are continuous with two adjacent tooth spaces 66b of the internal gear 66.

In assembling the fifth group unit 250 in the cam frame 260, the two protrusions 252a of the first fifth cam follower 252A pass through the two adjacent tooth spaces 66b to enter the introducing parts 265a of the first fifth cam groove 265A. The protrusions 252a and the introducing parts continuous with the two tooth spaces 66b are made smaller than the tooth space 66b. Specifically, the protrusions 252a and the introducing parts are configured in the same manner as those of the first embodiment.

Thus, the first fifth cam follower 252A can be improved in strength without increasing the size of the tooth space 66b of the internal gear 66. This can improve the resistance of the lens barrel 100 to an external force applied thereto when the lens barrel 100 is dropped, etc. Since there is no need of increasing the size of the tooth space 66b, thickening of the internal gear 66 and the cam frame 60 can be prevented, and therefore, upsizing of the lens barrel 100 due to the thickening of the cam frame 60 can be prevented.

The embodiments have been described together with the drawings and detailed description for the purpose of illustration of the disclosed technology. The embodiments described above are not limited to the present disclosure, and may suitably be omitted, substituted, modified, or replaced within the scope of claims or an equivalent thereof. The components described in the embodiments may be combined to create a new embodiment.

The attached drawings and the detailed description may include not only the components essential for solving the problem, but also components nonessential for solving the problem to illustrate the disclosed technology. The nonessential components should not be construed as essential components because of their presence in the attached drawings and the detailed description.

The present disclosure is applicable to lens barrels capable of scaling a focal length. The present disclosure is also applicable to imaging devices, cameras, interchangeable lenses, mobile terminals equipped with a camera function, etc.

What is claimed is:

1. A lens barrel, comprising:
a cam frame;
a first driver for driving the cam frame to rotate about an optical axis; and
a first optical unit including a cam follower, and engaging with the cam frame through the cam follower to move in an optical axis direction as the cam frame rotates, wherein
the cam frame includes a gear part engaging with the first driver, and a cam groove engaging with the cam follower,
the gear part includes a plurality of teeth aligned in a circumferential direction about the optical axis,
the cam groove is continuous with a tooth space formed between two adjacent teeth, and
the cam follower is smaller than the tooth space to pass through the tooth space.

2. The lens barrel of claim 1, wherein
the gear part is provided at an end of the cam frame in the optical axis direction, and
at least part of the cam groove is formed at a side of the gear part opposite to the end of the cam frame in the optical axis direction.

3. The lens barrel of claim 1, wherein
the cam follower is tapered,
the tooth space has a width decreasing with decreasing distance from a bottom of the tooth space, and
an angle of inclination of the cam follower is substantially the same as an angle of inclination of the tooth space.

4. The lens barrel of claim 1, wherein
the cam groove has a smaller width than the tooth space.

5. The lens barrel of claim 1, wherein
a base end of the cam follower has a smallest transverse cross-sectional area among base ends of cam followers of optical units included in the lens barrel and driven by a cam mechanism.

6. The lens barrel of claim 1, wherein
the first optical unit is a lightest optical unit among optical units included in the lens barrel and driven by a cam mechanism.

7. The lens barrel of claim 1, further comprising:

a second optical unit located inside the cam frame;

a support frame which supports the second optical unit to be movable in the optical axis direction, and is contained inside the cam frame; and a second driver provided in the support frame to drive the second optical unit, wherein at least part of the cam groove is formed closer to the second optical unit than the gear part in the optical axis direction.

* * * * *